United States Patent
Morita et al.

(10) Patent No.: US 8,037,495 B2
(45) Date of Patent: Oct. 11, 2011

(54) ELECTRONIC PROGRAM GUIDE DISPLAY DEVICE, AND ELECTRONIC PROGRAM GUIDE DISPLAY METHOD

(75) Inventors: Takuya Morita, Osaka (JP); Hirokazu Sasaki, Kyoto (JP); Mitsuteru Kataoka, Osaka (JP)

(73) Assignee: Panasonic Corporation, Osaka (JP)

( * ) Notice: Subject to any disclaimer, the term of this patent is extended or adjusted under 35 U.S.C. 154(b) by 581 days.

(21) Appl. No.: 12/162,555

(22) PCT Filed: Jan. 24, 2007

(86) PCT No.: PCT/JP2007/051072
§ 371 (c)(1), (2), (4) Date: Jul. 29, 2008

(87) PCT Pub. No.: WO2007/086416
PCT Pub. Date: Aug. 2, 2007

(65) Prior Publication Data
US 2009/0025032 A1    Jan. 22, 2009

(30) Foreign Application Priority Data
Jan. 30, 2006   (JP) ................................. 2006-020261

(51) Int. Cl.
*G06F 3/00*      (2006.01)
*G06F 13/00*     (2006.01)
*G06F 3/048*     (2006.01)
*H04N 5/445*     (2011.01)

(52) U.S. Cl. .............. 725/52; 725/39; 725/40; 348/734; 715/721; 715/816; 715/963

(58) Field of Classification Search .................. 715/721, 715/816, 963; 348/734; 345/156–184
See application file for complete search history.

(56) References Cited

U.S. PATENT DOCUMENTS

| | | | |
|---|---|---|---|
| 6,166,778 A * | 12/2000 | Yamamoto et al. | 348/569 |
| 6,230,323 B1 | 5/2001 | Hama et al. | |
| 2002/0087982 A1 * | 7/2002 | Stuart | 725/39 |
| 2002/0188944 A1 * | 12/2002 | Noble | 725/39 |
| 2003/0005441 A1 * | 1/2003 | Inoue | 725/39 |

(Continued)

FOREIGN PATENT DOCUMENTS

EP    1 274 234    1/2003

(Continued)

OTHER PUBLICATIONS

International Search Report issued Feb. 27, 2007 in the International (PCT) Application No. PCT/JP2007/051072.

(Continued)

*Primary Examiner* — Dominic D Saltarelli
*Assistant Examiner* — Omar S Parra
(74) *Attorney, Agent, or Firm* — Wenderoth Lind & Ponack, L.L.P.

(57) ABSTRACT

An electronic program guide display device includes a remote control input analyzing part analyzing a key-input from a remote control unit, a time converting part converting the key-input analyzed by the remote control input analyzing part into a time, and a display area calculating part calculating a display area for a two-dimensional program table based on the time converted by the time converting part. The electronic program guide display device also includes a program guide forming part forming a two-dimensional program table in the display area calculated by the display area calculating part, so as to allow a desired program to be browsed by a short-time operation.

3 Claims, 16 Drawing Sheets

U.S. PATENT DOCUMENTS

| | | |
|---|---|---|
| 2004/0250278 A1 | 12/2004 | Imai et al. |
| 2005/0058433 A1 | 3/2005 | Young |
| 2005/0097601 A1* | 5/2005 | Danker et al. ............... 725/39 |
| 2005/0154999 A1* | 7/2005 | Wugoski ..................... 715/827 |
| 2006/0015900 A1* | 1/2006 | Cezeaux et al. ............. 725/40 |
| 2008/0282289 A1* | 11/2008 | Drazin ......................... 725/40 |

FOREIGN PATENT DOCUMENTS

| | | |
|---|---|---|
| JP | 10-276378 | 10/1998 |
| JP | 2000-13707 | 1/2000 |
| JP | 2001-24965 | 1/2001 |
| JP | 2002-44554 | 2/2002 |
| JP | 2002-77762 | 3/2002 |
| JP | 2005-12412 | 1/2005 |
| WO | 03/032631 | 4/2003 |

OTHER PUBLICATIONS

International Preliminary Report on Patentability issued Aug. 14, 2008 in the International (PCT) Application. No. PCT/JP2007/051072.

Supplementary European Search Report issued May 28, 2009 in the European Application No. EP 07 70 7319.

European Official Communication issued Apr. 19, 2011 in European Application No. 07 707 319.5 which is a foreign counterpart of the present application.

* cited by examiner

Fig.3

BS PROGRAM TABLE

[YELLOW] -JUMP MODE SWITCH

<CHANNEL JUMP MODE>

| | NHK BS [1] | NHK BS2 [2] | NHK h [3] — 301 |
|---|---|---|---|
| 20:00 | 00 PROGRAM 1 | 00 PROGRAM 5 | 00 PROGRAM 9 |
| 21:00 | 00 PROGRAM 2 | 40 PROGRAM 6 | 00 PROGRAM 10 |
| | 30 PROGRAM 3 | 00 PROGRAM 7 | |
| 22:00 | 00 PROGRAM 4 | 00 PROGRAM 8 | |

BS PROGRAM TABLE

YELLOW - JUMP MODE SWITCH

<TIME JUMP MODE>

| | NHK BS1 | NHK BS2 | NHK h |
|---|---|---|---|
| 20:00 | 00 PROGRAM 1 | 00 PROGRAM 5 | 00 PROGRAM 9 |
| 8 | | 40 PROGRAM 6 | |
| 21:00 | 00 PROGRAM 2 | 00 PROGRAM 7 | 00 PROGRAM 10 |
| 9 | 30 PROGRAM 3 | | |
| 22:00 | 00 PROGRAM 4 | 00 PROGRAM 8 | |
| 10 | | | |

BS PROGRAM TABLE  [BLUE] - PREVIOUS DAY  [RED] - NEXT DAY

1509

| | 26TH (WEDNESDAY) | 27TH (THURSDAY) | 28TH (FRIDAY) | 29TH (SATURDAY) | 30TH (SUNDAY) | 31ST (MONDAY) | 1ST (TUESDAY) | 2ND (WEDNESDAY) |
|---|---|---|---|---|---|---|---|---|
| | | NHK BS [1] | | | NHK BS2 [2] | | NHK h [3] | |
| 20:00 | | 00 PROGRAM 1 | | | 00 PROGRAM 5 | | 00 PROGRAM 9 | |
| 21:00 | | 00 PROGRAM 2 | | | 40 PROGRAM 6 | | | |
| | | 30 PROGRAM 3 | | | 00 PROGRAM 7 | | 00 PROGRAM 10 | |
| 22:00 | | 00 PROGRAM 4 | | | 00 PROGRAM 8 | | | |

ELECTRONIC PROGRAM GUIDE DISPLAY DEVICE, AND ELECTRONIC PROGRAM GUIDE DISPLAY METHOD

TECHNICAL FIELD

The present invention relates to an electronic program guide display device and an electronic program guide display method which are used for broadcasting receiver, and receive and display electronic program guide information representing broadcast channels, broadcast times, and the like related to programs which are being broadcasted and scheduled to be broadcasted and, more particularly, to an electronic program guide display device and an electronic program guide display method which improve operability when a program desired by a user is searched for or information related to the program is acquired.

BACKGROUND ART

In television broadcast, in addition to video information and audio information, additional information representing broadcast contents, broadcast channels, broadcast times, and the like related to programs can be multiplexed and transmitted. In addition to a method of acquiring additional information from a television broadcast, a method which has a function of being connected to the Internet to acquire additional information through the Internet is known. For this reason, some broadcasting receiver for a television broadcast has a function of performing on-screen display generally called an electronic program guide (EPG) by using these pieces of additional information. A user using a broadcasting receiver selects a desired broadcast channel and a desired broadcast time from the electronic program guide displayed on a screen or selects a desired program to make it possible to actually display the selected program on the screen of the broadcasting receiver or to reserve a program.

In a display mode of an electronic program guide, a two-dimensional program table which displays broadcast channels and broadcast times in two orthogonal axes in the horizontal direction and the vertical direction as in a television guide of a newspaper is frequently used. As another display mode, a different-channel program table which displays information of an on-air program in another broadcast channel different from that of a display screen, a list which displays categories of programs and a program searched by a keyword as a list, or the like is known.

In the two-dimensional program table, in terms of visibility or operability, a display range on one screen is generally 3 to 9 channels as a display of broadcast channels, and a display range of broadcast times is generally 3 to 6 hours. Therefore, a user operates keys on a remote control unit (remote controller) to move a display screen up, down, left, or right to display a program desired to be seen. In this manner, the user scrolls the display screen along an axial direction of broadcast channels on the electronic program guide to make it possible to browse information of programs which are currently being broadcasted at all the channels. The user scrolls the display screen along the axial direction of a broadcast time of the electronic program guide to make it possible to display all program information sent from a broadcast transmission side at the channels. When the display screen is scrolled in the axial direction of the broadcast time, for example, programs of the channels until 24:00 (12 midnight) 7 days later can be displayed.

In general, when a user request to display a two-dimensional program table, on an initial screen displayed on a receiver side at the beginning, at a broadcast time, information for several hours from the current time is displayed. At broadcast channels, several channels before and after the channel selected at the present or several channels in the back of the selected channel are frequently displayed in the order of channel numbers. After the initial screen is displayed, the user scrolls broadcast channels or broadcast times to search for a desired program, so that detailed program information related to the program such as the program name, start time, end time, and explanation of the detailed contents of the program are acquired.

In the conventional electronic program guide display device and the electronic program guide display method, when a time of a program desired to be seen by a user is separated from the current time, a scroll operation must be performed frequently or for a long period of time. It is very cumbersome to move the screen to a desired time, and the usability disadvantageously becomes poor.

In some conventional broadcasting receiver, a date or a day of the week is designated, a screen is temporarily moved to the designated date or the designated day of the week. Thereafter, a scroll operation by the hour is performed to cause the screen to reach a desired time. In this manner, some broadcasting receiver has a function of temporarily moving the screen to the designated date or the designated day of the week to shorten a period of time for a scroll operation. However, even though the function is used, although certain trouble may be saved, the above problem in which the receiver is complicated and has poor usability is not essentially solved.

A configuration of the conventional electronic program guide display device will be described below with reference to FIGS. 15 and 16. A concrete example of a two-dimensional program table which is formed and displayed by the conventional electronic program guide display device is shown.

FIG. 15 is a block diagram showing a configuration of the conventional electronic program guide display device. FIG. 16 is a diagram showing a concrete example of a two-dimensional program table formed and displayed by the electronic program guide display device.

As shown in FIG. 15, a conventional electronic program guide display device 1500 includes a receiving part 1501, a multiplexing/separating part 1502, a decode part 1503, a program information management part 1504, a remote control input analyzing part 1505, a channel converting part 1506, a display area calculating part 1507, a program guide formation part 1508, and a display part 1509. A remote controller 2200 is connected to the electronic program guide display device 1500 such that a signal can be transmitted to the electronic program guide display device 1500. A command of a user from the remote controller 2200 is input to the electronic program guide display device 1500. In the following description, it is assumed that a broadcast channel is simply called a channel and that a broadcast time is simply called a time.

On the remote controller 2200, in addition to a power supply key, 10 numeric keys (0 to 9) and direction indicating keys which move a designated region in the horizontal and vertical directions are arranged. On the remote controller 2200, blue, red, green, and yellow keys are arranged, so that unique functions in the device can be achieved by key operations, respectively.

The receiving part 1501 in the electronic program guide display device 1500 receives a multiplexed stream of a digital broadcast. The multiplexing/separating part 1502 separates the multiplexed stream input from the receiving part 1501 into not only arbitrary digital video information and digital audio information but also program information including channel information, time information, program content information, and the like as service information. The decode part 1503 decodes the digital video information and the digital audio information input from the multiplexing/separating part 1502. The program information management part 1504 extracts program information from the information separated by the multiplexing/separating part 1502 and accumulates and manages program information in all periods of time at all the channels.

The remote control input analyzing part 1505 analyzes the type of an input key by a key operation of a user on the remote controller 2200 to determine an output destination on the basis of the analysis result. When the analysis result of the remote control input analyzing part 1505 is a numeric key, the channel converting part 1506 receives a signal of the numeric key from the remote control input analyzing part 1505 to convert the input signal representing the numeric key into a signal representing a channel.

When the analysis result of the remote control input analyzing part 1505 is a direction designation key representing a moving direction of a designation region, the display area calculating part 1507 receives a signal representing the vertical and horizontal moving directions from the remote control input analyzing part 1505 and calculates a scroll direction of the display area for a two-dimensional program table according to the moving direction. When the analysis result of the remote control input analyzing part 1505 is the blue key or the red key, the display area calculating part 1507 which receives a date indication signal from the blue key or the red key calculates a date displayed on the two-dimensional program table.

Furthermore, the display area calculating part 1507 calculates a display area for the two-dimensional program table on the basis of the signal representing a channel input from the channel converting part 1506.

The program guide forming part 1508 receives a calculation result from the display area calculating part 1507 and necessary information from the program information management part 1504 to form a two-dimensional program table. The display part 1509 displays a video image by the decoded video information and the decoded audio information input from the decode part 1503 or displays the two-dimensional program table input from the program guide forming part 1508.

Next, a detailed description will be given of operations of the components of the electronic program guide display device 1500 performed until switching display of the two-dimensional program table is performed on the display part 1509 after key inputting is performed by a key operation of the remote controller 2200.

When a specific key is depressed (key-input) by the key operation of the remote controller 2200, the remote control input analyzing part 1505 analyzes a type of the key-input. More specifically, the remote control input analyzing part 1505 analyzes whether any one of the direction designation key which moves a cursor position on the two-dimensional program table up, down, left, or right by the hour or in units of channels one by one, the blue key or the red key which changes dates on the two-dimensional program table, the numeric key which jumps a channel or a date on the two-dimensional program table, and other keys is operated.

The remote control input analyzing part 1505 outputs a signal representing a designated direction to the display area calculating part 1507 when the analysis result of the key-input from the remote controller 2200 is the direction designation key representing any direction of the upward, downward, leftward, and rightward directions. When the analysis result of the key-input from the remote controller 2200 is the blue key or the red key, the remote control input analyzing part 1505 outputs a signal representing a date previous to the current date to the display area calculating part 1507 when the analysis result is the blue key, and the remote control input analyzing part 1505 outputs a signal representing a date next to the current date to the display area calculating part 1507 when the analysis result is the red key.

The channel converting part 1506 converts a number of a numeric key input from the remote control input analyzing part 1505 into a corresponding channel and outputs the channel to the display area calculating part 1507 such that the channel is located at a reference position for a display of the two-dimensional program table. For example, when "2" is input by the numeric key, the channel converting part 1506 sets "channel 2" as a channel for the reference position on the two-dimensional program table.

When the signal of the direction designation key is input from the remote control input analyzing part 1505, the display area calculating part 1507 calculates a display area such that a cursor position of a program list displayed by the current two-dimensional program table is moved in the designated direction of the upward, downward, leftward, and rightward directions. When the signal of the blue key or the red key is input from the remote control input analyzing part 1505, the display area calculating part 1507 calculates a display style such that a date of the program field displayed by the current two-dimensional program table is changed into a date previous to the current date when the blue key is input and the date of the program field is changed into a date next to the current date when the red key is input. When a signal which designates a channel serving as a reference position for the display of the two-dimensional program table is input from the channel converting part 1506, for example, a display area for the two-dimensional program table is calculated such that the designated channel is arranged at a center position of a channel axis of the display for the two-dimensional program table. The display area calculating part 1507 outputs the calculated display area for the two-dimensional program table to the program guide forming part 1508.

The program guide forming part 1508 receives the program information accumulated and managed by the program information management part 1504 to form the two-dimensional program table adjusted to the display area calculated by the display area calculating part 1507. The program guide forming part 1508 outputs a command signal to the display part 1509 such that the two-dimensional program table displayed at the present is switched to a newly formed two-dimensional program table and the switched two-dimensional program table is displayed.

The display part 1509 which receives a command signal of switching display from the program guide forming part 1508 switches the new two-dimensional program table input from the program guide forming part 1508 to the two-dimensional program table displayed at the present and displays the two-dimensional program table.

A concrete display screen of the two-dimensional program table which is formed and displayed by the conventional electronic program guide display device 1500 will be described below with reference to FIG. 16.

FIG. 16 is a diagram concretely showing a display screen of the two-dimensional program table displayed on the display part 1509. In the display screen of the two-dimensional program table shown in FIG. 16, channels are arranged in the horizontal direction, and times are arranged in the vertical direction. The date tab representing a date is arranged in an upper portion of a channel display field. In general, information of an electronic program guide includes information for 8 days including the current date and does not have information subsequent to the 8 days. Therefore, in the conventional electronic program guide display device 1500, the information for the 8 days including the current date is displayed. The date tab which is especially enlarged and displayed indicates program data displayed at the present.

When a user desires to browse program data at a desired time, a time axis is scrolled by the direction designation key representing the upward and downward directions, the time is jumped to a time of the date previous to the current date by the blue key, or the time is jumped to a time of the date next to the current date by the red key.

As another approach performed when the user desires to browse electronic program data at a desired time, in a method disclosed in Japanese Unexamined Patent Publication No. 2002-44554, analog time display is performed to make it possible to move a display area to a target time by only the key representing the leftward and rightward directions, and when the key representing the leftward and rightward directions is continuously depressed, only an analog clock is updated without displaying the program information to shorten a period of moving time.

In the method disclosed in Japanese Unexamined Patent Publication No. 2005-12412, a key representing a destination on the next day, a day after a week or the like is displayed on the screen to make it possible to jump the date.

In the method disclosed in Japanese Unexamined Patent Publication No. H10-276378, a scroll bar is displayed on the screen of the electronic program guide, and a channel, a date, or a time is jumped such that a cursor is pointed to the scroll bar.

Patent Document 1: Japanese Unexamined Patent Publication No. 2002-44554
Patent Document 2: Japanese Unexamined Patent Publication No. 2005-12412
Patent Document 3: Japanese Unexamined Patent Publication No. H10-276378

DISCLOSURE OF INVENTION

Problems to be Solved by the Invention

However, in the conventional configuration, the key representing the leftward and rightward directions must be continuously depressed until, for example, an analog time represents a desired time. A cursor is moved to a scroll bar displayed on the two-dimensional program table, and an operation of moving the scroll bar to the desired time must be performed. For this reason, in the conventional electronic program guide display device, a cumbersome operation is required until a user moves the scroll bar to the desired time, and a problem of taking a long period of time for a scroll operation is still left unsolved.

The present invention has been made to solve the above problem in the conventional electronic program guide display device, and has as its object to provide an electronic program guide display device and an electronic program guide display method which can move a display area to a target time within a short period of time with a small number of operations and intuitive operations by a user.

Means for Solving the Problem

An electronic program guide display device according to a first aspect of the present invention, in order to solve the problem in the conventional electronic program guide display device and to achieve the above object, includes: a remote control input analyzing part which analyzes a key-input from a remote control unit; a time converting part which converts the key-input analyzed by the remote control input analyzing part into a time; a display area calculating part which calculates a display area for a two-dimensional program table on the basis of the time converted by the time converting part; and a program guide forming part which forms a two-dimensional program table in the display area calculated by the display area calculating part. The electronic program guide display device according to the present invention configured as described above can easily display a program field at a time desired to be browsed by a user within a short period of time.

In an electronic program guide display device according to a second aspect of the present invention, the time converting part according to the first aspect is configured such that a time represented by the key-input is advanced by 12 hours each time the key-input from the remote control unit is performed. The electronic program guide display device according to the present invention configured as described above can easily perform a time jump on the two-dimensional program table, and can display a program desired to be browsed by a user within a short period of time.

An electronic program guide display device according to a third aspect of the present invention further includes a date converting part which converts the key-input analyzed by the remote control input analyzing part according to the second aspect into a date, the display area calculating part is configured to calculate a display area for the two-dimensional program table by the date converted by the date converting part, and the program guide forming part is configured to form a two-dimensional program table in the display area calculated by the display area calculating part. The electronic program guide display device according to the present invention configured as described above can easily display a program field on a date desired to be browsed by a user within a short period of time.

An electronic program guide display device according to a fourth aspect of the present invention further includes a channel converting part which converts the key-input analyzed by the remote control input analyzing part according to the second aspect into a channel, the display area calculating part is configured to calculate a display area for a two-dimensional program table on the basis of the channel converted by the channel converting part, and the program guide forming part is configured to form s two-dimensional program table in the display area calculated by the display area calculating part. The electronic program guide display device according to the present invention configured as described above can easily display a program field of a channel desired to be browsed by a user within a short period of time.

An electronic program guide display device according to a fifth aspect of the present invention is configured to display a number represented by a numeric key in a time field of the two-dimensional program table formed by the program guide forming part according to the second aspect. The electronic program guide display device according to the present invention configured as described above can easily perform the time jump on the two-dimensional program table.

An electronic program guide display device according to a sixth aspect of the present invention is configured such that the time converting part according to the second aspect converts an input of a direction designation key representing the upward, downward, leftward, and rightward directions into a time. The electronic program guide display device according to the present invention configured as described above can display a program desired to be browsed by a user within a short period of time.

An electronic program guide display device according to a seventh aspect of the present invention is configured such that the time converting part according to the sixth aspect converts the upward key into 0:00, a downward key into 6:00, a leftward key into 9:00, and a rightward key into 3:00. The electronic program guide display device according to the present invention configured as described above can perform the time jump on the two-dimensional program table by an intuitive operation of a user.

An electronic program guide display device according to an eighth aspect of the present invention is configured such that the program guide forming part according to the sixth aspect displays a time jump panel representing the same configuration as that of the designated direction keys representing the upward, downward, leftward, and rightward directions arranged on the remote control unit on a screen. The electronic program guide display device according to the present invention configured as described above makes a browsing operation of a user easy and can display a program desired by the user within a short period of time.

An electronic program guide display device according to a ninth aspect of the present invention is configured such that jump modes of the electronic program guide are switched by display or non-display of the time jump panel according to the eighth aspect. The electronic program guide display device according to the present invention configured as described above can display a program desired to be browsed by a user within a short period of time.

An electronic program guide display device according to a tenth aspect of the present invention is configured such that the time jump panel according to the eighth aspect is not displayed after a predetermined period of time is elapsed when a key operation is not performed. The electronic program guide display device according to the present invention configured as described above does not require a special operation which eliminates a jump panel to perform a normal operation because the time jump panel is eliminated after the predetermined period of time is elapsed, and an easily handled device can be achieved.

An electronic program guide display device according to an eleventh aspect of the present invention includes: a remote control input analyzing part which analyzes a key-input from a remote control unit; a date converting part which converts the key-input analyzed by the remote control input analyzing part into a date; a display area calculating part which calculates a display area for a two-dimensional program table on the basis of the date converted by the date converting part; and a program guide forming part which forms a two-dimensional program table in the display area calculated by the display area calculating part. The electronic program guide display device according to the present invention configured as described above can easily display a program field on a date desired to be browsed by a user within a short period of time.

An electronic program guide display device according to a twelfth aspect of the present invention is configured such that the date converting part according to the eleventh aspect converts the key-input into a nearest future date having a last-one-digit number represented by a numeric key input from the remote control unit. The electronic program guide display device according to the present invention configured as described above can display a program field on a date desired to be browsed by a user within a short period of time.

The electronic program guide display device according to a thirteenth aspect of the present invention is configured such that the remote control unit according to the eleventh aspect has at least numeric keys "1" to "11" and the date converting part converts the date into the "31st" when the numeric key input from remote control unit is "11". The electronic program guide display device according to the present invention configured as described above can easily display a program field on a data desired to be browsed by a user within a short period of time.

An electronic program guide display device according to a fourteenth aspect of the present invention includes: a remote control input analyzing part which analyzes a key-input from a remote control unit; a date and time converting part which converts the key-input analyzed by the remote control input analyzing part into a date and time; a display area calculating part which calculates a display area for a two-dimensional program table on the basis of the date and time converted by the date and time converting part; and a program guide forming part which forms a two-dimensional program table in the display area calculated by the display area calculating part. The electronic program guide display device according to the present invention configured as described above can easily display a program field on a date and time desired to be browsed by a user within a short period of time.

An electronic program guide display device according to a fifteenth aspect of the present invention is configured such that the date and time converting part according to the fourteenth aspect converts a four-digit number input by the numeric keys from the remote control unit into a date and time. The electronic program guide display device according to the present invention configured as described above can easily perform a date and time jump on the two-dimensional program table and can display a program desired to be browsed by a user within a short period of time.

An electronic program guide display method according to a sixteenth aspect of the present invention includes: the step of analyzing a key-input from a remote control unit; the step of converting the analyzed key-input into a time; the step of calculating a display area for a two-dimensional program table on the basis of the converted time; and the step of forming a two-dimensional program table in the calculated display area. According to the electronic program guide display method of the present invention having the above steps, a program field at a time desired to be browsed by a user can be easily displayed within a short period of time.

In an electronic program guide display method according to a seventeenth aspect of the present invention, in the step of converting the analyzed key-input into a time in the sixteenth aspect, a time represented by the key-input is advanced by 12 hours each time the key-input from the remote control unit is performed. According to the electronic program guide display method of the present invention having the step, the time jump on the two-dimensional program table can be easily performed, and a program desired to be browsed by a user can be displayed within a short period of time.

An electronic program guide display method according to an eighteenth aspect of the present invention further includes the step of converting the analyzed key-input in the seventeenth aspect into a date, a display area for a two-dimensional program table is calculated on the basis of the converted date, and the two-dimensional program table is formed in the calculated display area. According to the electronic program guide display method of the present invention having the step, a program field on a date desired to be browsed by a user can be easily displayed within a short period of time.

An electronic program guide display method according to a nineteenth aspect of the present invention further includes the step of converting the analyzed key-input in the eighteenth aspect into a channel, a display area for a two-dimensional program table is calculated on the basis of the converted channel, and a two-dimensional program table is formed in the calculated display area. According to the electronic program guide display method of the present invention having the step, a program field of a channel desired to be browsed by a user can be easily displayed within a short period of time.

In an electronic program guide display method according to a twentieth aspect of the present invention, in the step of converting the analyzed key-input in the seventeenth aspect into a time, an input of a direction designation key representing the upward, downward, leftward, and rightward directions from the remote control unit is converted into a time. According to the electronic program guide display method of the present invention having the step, a program desired to be browsed by a user can be displayed within a short period of time.

In an electronic program guide display method according to a twenty-first aspect of the present invention, in the step of converting the analyzed key-input in the seventeenth aspect into a time, the upward key is converted into 0:00, the downward key is converted into 6:00, the leftward key is converted into 9:00, and the rightward key is converted into 3:00 on the remote control unit. According to the electronic program guide display method of the present invention having the step, the time jump on the two-dimensional program table can be performed by an intuitive operation of a user.

In an electronic program guide display method according to a twenty-second aspect of the present invention, in the step of converting the analyzed key-input in the sixteenth aspect into a time, an input of a four-digit number by the numeric keys from the remote control unit is converted into a date and time. According to the electronic program guide display method of the present invention having the step, the date and time jump on the two-dimensional program table can be easily performed, and a program desired to be browsed by a user can be displayed within a short period of time.

In an electronic program guide display method according to a twenty-third aspect of the present invention, in the step of converting the analyzed key-input in the sixteenth aspect into a time, the key-input is converted into a nearest future date having a last-one-digit number represented by a numeric key input from the remote control unit. The electronic program guide display method of the present invention having the step can display a program field on a date desired to be browsed by a user within a short period of time.

Effect of the Invention

According to the electronic program guide display device and the electronic program guide display method of the present invention, without performing a long-time operation of scrolling a two-dimensional program table to a time desired to be browsed by a user by continuously depressing a key to perform display, a numeric key or a direction designation key representing upward, downward, leftward, and rightward moving directions on a remote control unit which can be intuitively operated by combining a date or a time to an image is input, so that a program on a desired date, at a desired time, or at a desired channel can be instantaneously displayed on the two-dimensional program table.

BRIEF DESCRIPTION OF THE DRAWINGS

FIG. 3 is a diagram of a display screen of a two-dimensional program table in a channel jump mode in the electronic program guide display device according to the first embodiment.

FIG. 4 is a diagram of a display screen of a two-dimensional program table in a time jump mode in the electronic program guide display device according to the first embodiment.

FIG. 16 is a diagram of a display screen of a two-dimensional program table in the conventional electronic program guide display device.

Figure 1:
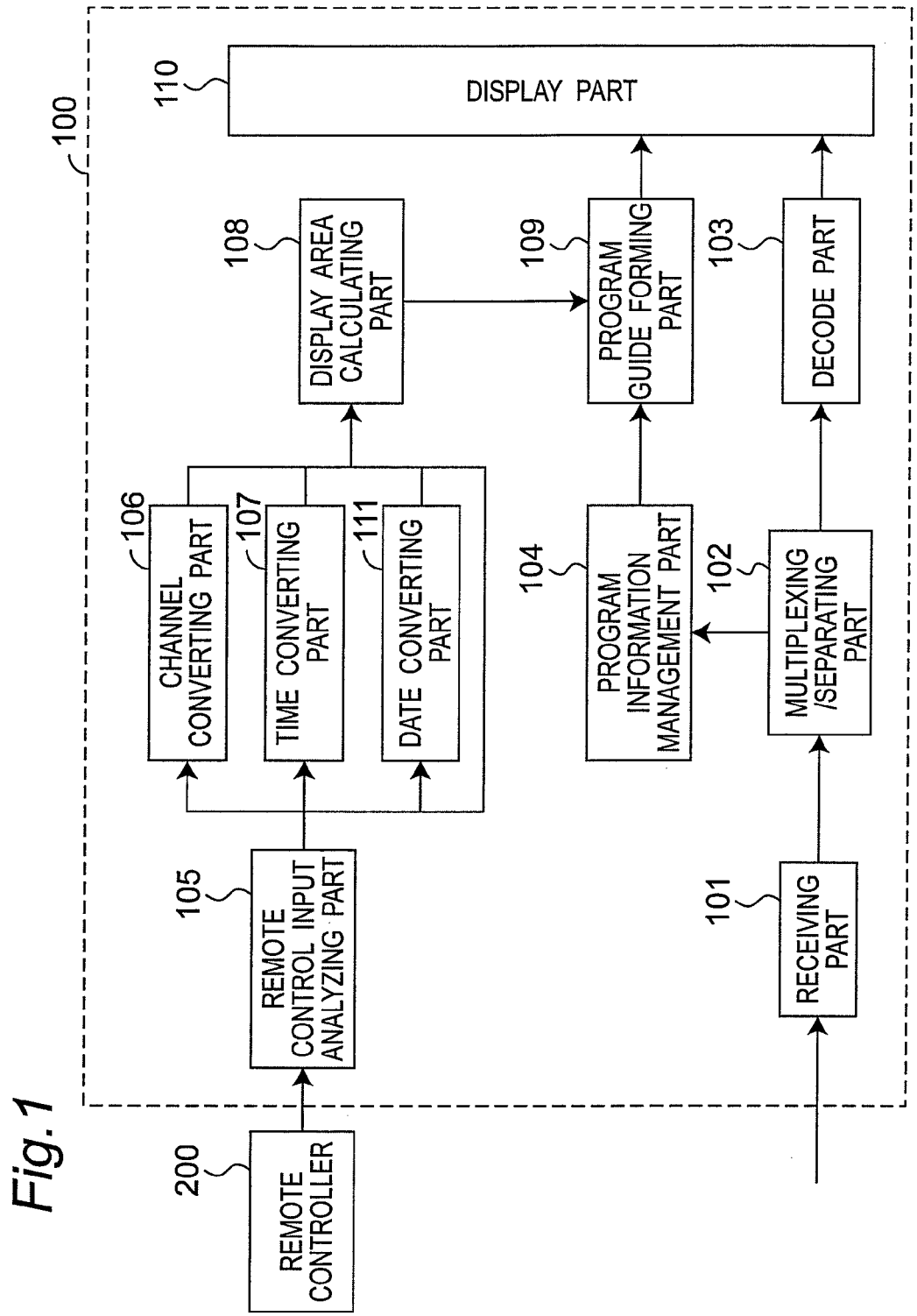
FIG. 1 is a block diagram showing a configuration of an electronic program guide display device (EPG display device) according to a first embodiment of the present invention.

EXPLANATION OF REFERENCE NUMERALS 100, 600, 900, 1200 Electronic program guide display device (EPG display device)
101, 601, 901, 1201 Receiving part
102, 602, 902, 1202 Multiplexing/separating part
103, 603, 903, 1203 Decode part
104, 604, 904, 1204 Program information management part
105, 605, 905, 1205 Remote control input analyzing part 106, 606, 906, 1206 Channel converting part
107, 607 Time converting part
108, 608, 908, 1208 Display area calculating part
109, 609, 909, 1209 Program guide forming part
110, 610, 910, 1210 Display part
111 Date converting part
200 Remote controller
201 Power supply key
202 Colored key region
203 Program table key
204 Direction designation key
205 Return key
206 Numeric key region
301 Channel write area
401 Time write area
701 Time jump panel
907 Date/time converting part
1001 Date/time input panel
1207 Date converting part
1301 Remote control guide
1302 Date tab
1303 Program field

BEST MODE FOR CARRYING OUT THE INVENTION

A best mode for carrying out an electronic program guide display device and an electronic program guide display method according to the present invention will be described below in detail with reference to the accompanying drawings.

First Embodiment

A configuration of an electronic program guide display device (to be abbreviated as an EPG display device hereinafter) 100 according to a first embodiment of the present invention will be described below with reference to FIGS. 1 to 5.

FIG. 1 is a block diagram showing a configuration of the EPG display device 100 according to the first embodiment of the present invention. The EPG display device 100 according to the first embodiment is made to avoid a trouble of performing scrolling along a time axis on a screen display of a two-dimensional program table. The EPG display device 100 according to the first embodiment has a characteristic feature in that a jump is performed by a small number of key operations in a remote control unit (to be abbreviated as a remote controller hereinafter) 200 along a time axis and a channel axis on the two-dimensional program table to make it possible to instantaneously move a display area to a target program.

[Configuration of EPG Display Device 100]

As shown in FIG. 1, the EPG display device 100 according to the first embodiment includes a receiving part 101, a multiplexing/separating part 102, a decode part 103, a program information management part 104, a remote control input analyzing part 105, a channel converting part 106, a time converting part 107, a display area calculating part 108, a program guide forming part 109, and a display part 110.

In the EPG display device 100 according to the first embodiment, the receiving part 101 receives a multiplexed stream of a digital broadcast. The multiplexing/separating part 102 separates the multiplexed stream input from the receiving part 101 into program information serving as digital video information, digital audio information, and service information. The program information includes information representing program contents, channel information, time information, and the like. The decode part 103 decodes the digital video information and the digital audio information input from the multiplexing/separating part 102. The program information management part 104 extracts program information from the information separated by the multiplexing/separating part 102, and accumulates and manages program information in all time zones of all channels.

The remote control input analyzing part 105 which is connected to a remote controller 200 such that a signal can be transmitted to the remote controller 200 and the remote control input analyzing part 105 analyzes a key input signal from the remote controller 200 which is key-operated by a user and selects an output destination of the key input signal on the basis of the analysis result. More specifically, the remote control input analyzing part 105 detects whether any one of input keys of types in the remote controller 200, for example, as described later, a numeric key, a direction designation key, and a colored key is operated, and selects an output destination suitable for the operated key-input. In this case, the direction designation key is a cursor moving key including a determination key at a center portion, and a key which designates a moving direction in a designation region in a display area as any one of the upward, downward, leftward, and rightward directions.

The colored key according to the first embodiment includes a blue key (push button having a blue outer surface), a red key (push button having a red outer surface), a green key (push button having a green outer surface), and a yellow key (push button having a yellow outer surface). Each of the keys is depressed to change a display style by the EPG display device. For example, when the blue key is operated, a two-dimensional program table on the previous day is displayed in the display area. When the red key is operated, a two-dimensional program table on the next day is displayed in the display area.

When the green key is operated, a mode in which the two-dimensional program table in the display area is enlarged or reduced is set. For example, each time the green key is depressed, the display screen is changed to a 3-channel display, a 5-channel display, a 7-channel display, and the returned 3-channel display. Each time the green key is sequentially depressed, display styles are switched. When the yellow key is operated, a jump mode and a normal mode are switched to each other. After the yellow key is operated, when the numeric key or the direction designation key is operated, a mode in which the display date or channel is jumped to a designated date or channel by the numeric key or the direction designation key is set.

When the analysis result of the remote control input analyzing part 105 is a numeric key, and when the jump mode of the two-dimensional program table at this time is a channel jump mode, a signal representing the numeric key is input to the channel converting part 106. The channel converting part 106 converts a signal representing a numeric key input from the remote control input analyzing part 105 into a signal representing a corresponding channel and outputs the signal to the display area calculating part 108.

When the analysis result of the remote control input analyzing part 105 is a numeric key, and when the jump mode of the two-dimensional program table at this time is a time jump mode, a signal representing the numeric key is input to the time converting part 107. The time converting part 107 converts the signal representing the numeric key input from the remote control input analyzing part 105 into a signal representing a corresponding time, and outputs the signal to the display area calculating part 108.

When the analysis result of the remote control input analyzing part 105 is the blue key or the red key serving as the colored key, a signal representing the blue key or the red key is input to a date converting part 111. In the date converting part 111, the signal is converted into a signal which jumps a date to a date designated by the blue key or the red key, and outputs the signal to the display area calculating part 108.

When a key operation of a user on the remote controller 200 is a direction designation key representing upward, downward, leftward, and rightward moving directions or key inputting which is not related to channel conversion, time conversion, and date conversion and which is related to screen display, signals representing these operations are output from the remote control input analyzing part 105 to the display area calculating part 108.

When the analysis result of the key-input from the remote control input analyzing part 105 is the direction designation key representing the upward, downward, leftward, and rightward moving directions, the display area calculating part 108 calculates a moving direction of scroll in a display area for a two-dimensional program table on the basis of a signal representing the direction designated by the direction designation key-input from the remote control input analyzing part 105. The display area calculating part 108 calculates a display area for a two-dimensional program table on the basis of a signal representing a channel, a time, or a date input from the channel converting part 106, the time converting part 107, or the date converting part 111.

The program guide forming part 109 forms a two-dimensional program table on the basis of a calculation result from the display area calculating part 108 in response to necessary program information from the program information management part 104. The display part 110 displays a video image by the decoded video information and the decoded audio information input from the decode part 103, or displays the two-dimensional program table input from the program guide forming part 109.

[Configuration of Remote Controller 200]

Figure 2:
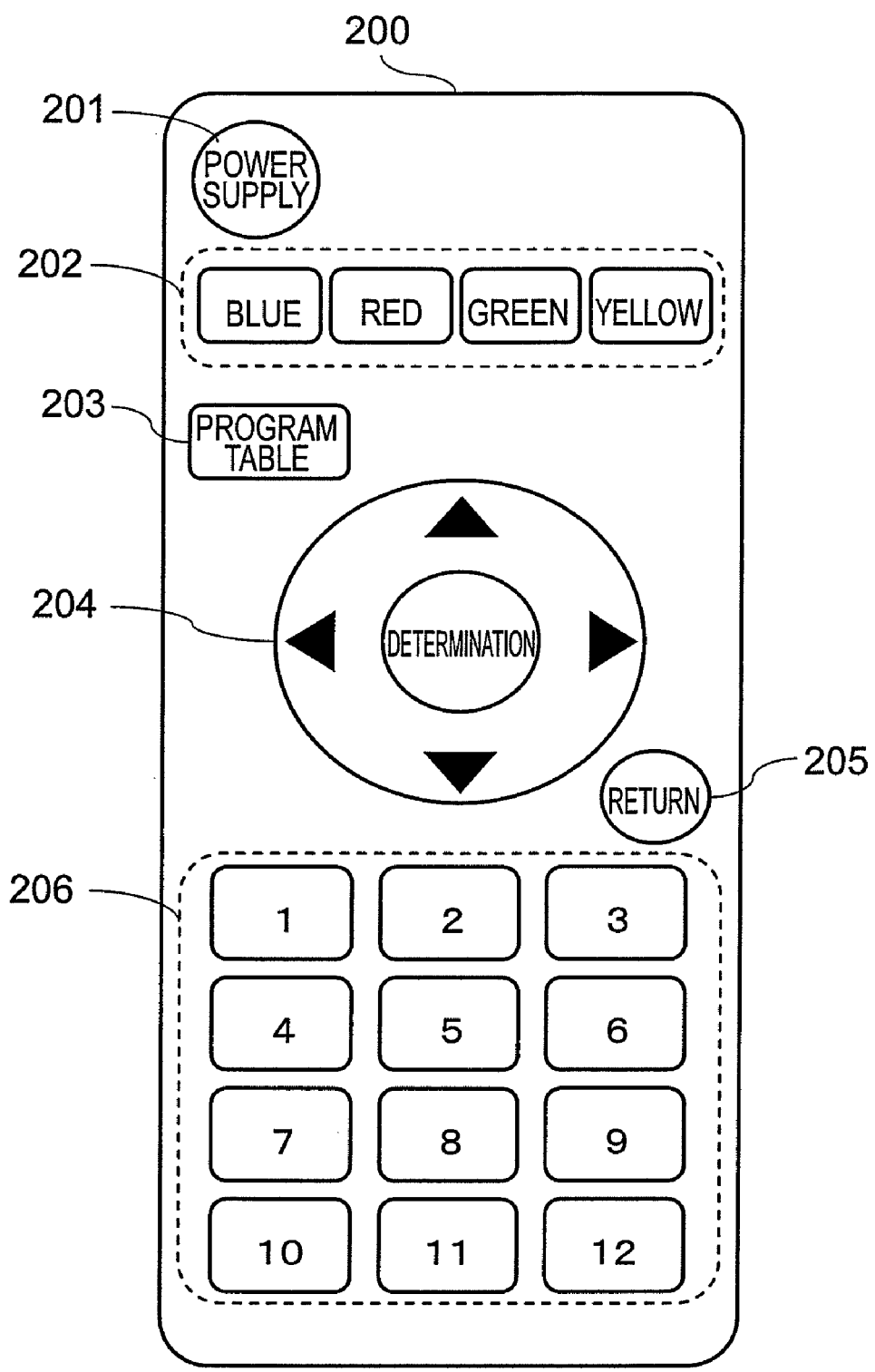
FIG. 2 is an external view of a remote control unit to operate the electronic program guide display device according to the first embodiment.

FIG. 2 is a plan view showing an operation surface of the remote controller 200 used in the EPG display device 100 according to the first embodiment of the present invention. A display screen of a two-dimensional program table displayed on the display part 110 of the EPG display device 100 according to the first embodiment is operated by a key operation on the operation surface of the remote controller 200. On the remote controller 200, a power supply key 201, a direction designation key 204 used to move a designation region of the two-dimensional program table up, down, left, or right, a return key 205 which returns a set state or a display state to a first previous state, and a program table key 203 to display a two-dimensional program table are arranged. On the remote controller 200, depending on a state of the television a colored key region 202 having a blue key, a red key, a green key and a yellow key the roles of which are changed and a numeric key region 206 having 12 numeric keys (1 to 12) generally used to switch the channels are arranged. Numbers 1 to 12 are added to the 12 numeric keys in the numeric key region 206, respectively. In initial setting at the time of purchase of a television, the channels are allocated to the numeric keys, respectively. When a channel is desired to be selected when a normal television broadcast is viewed, these numeric keys are selectively depressed to make it possible to select an arbitrary channel. Furthermore, the numeric keys in the numeric key region 206 in the first embodiment are also used to input a channel and a time of a destination of jump when the two-dimensional program table is jumped.

[Operation of EPG Display Apparatus 100]

Operations of the respective components in the EPG display device 100 until switching display of a two-dimensional program table is performed in a display part 110 after a key operation on the remote controller 200 is performed will be described below in detail.

When a user performs a key operation on the remote controller 200, the remote control input analyzing part 105 analyzes whether any one of the keys is operated on the basis of a signal representing the key-input from the remote controller 200. More specifically, the remote control input analyzing part 105 analyzes whether any one of the direction designation key 204 which moves a cursor position on a two-dimensional program table up, down, left, or right one by one (by the hour or in units of channels), the blue key which moves a display area of the two-dimensional program table to a display area on the previous day, the red key which moves the display area of the two-dimensional program table to a display area on the next day, the green key which enlarges/reduces a display of a display area of the two-dimensional program table, the yellow key which sets a jump mode, a numeric key which jumps a display channel or a display time to a channel or a time designated on the two-dimensional program table in the jump mode, and other keys is operated.

When an analysis result of the input key from the remote controller 200 is the direction designation key 204 representing any one of the upward, downward, leftward, and rightward directions, the remote control input analyzing part 105 outputs a signal representing the direction designated by the direction designation key 204 to the display area calculating part 108. When the analysis result of the input key from the remote controller 200 is the yellow key, the remote control input analyzing part 105 determines that the jump mode is set to detects that the jump mode of the two-dimensional program table is any one of a channel jump mode and a time jump mode. In the EPG display device according to the first embodiment, each time the yellow key is input, the jump mode is switched between the channel jump mode and the time jump mode.

When the jump mode is the channel jump mode, when the input key from the remote controller 200 is the numeric key, the remote control input analyzing part 105 outputs a signal representing a number designated by the numeric key to the channel converting part 106. On the other hand, when the jump mode is the time jump mode, when the input key from the remote controller 200 is the numeric key, the remote control input analyzing part 105 outputs a signal representing a number designated by the numeric key to the time converting part 107.

The channel converting part 106 converts the signal representing the number designated by the numeric key input from the remote control input analyzing part 105 into a signal representing a corresponding channel. The channel converting part 106 outputs the signal to the display area calculating part 108 as a channel on which the designated channel serves as a reference position in the display area of the two-dimensional program table. For example, when "2" is input by the numeric key, the channel converting part 106 outputs a set signal which sets a "channel 2" as the channel of the reference position on the two-dimensional program table.

The time converting part 107 converts the signal representing a number designated by the numeric key input from the remote control input analyzing part 105 into a signal representing a corresponding time. The time converting part 107 outputs a signal to the display area calculating part 108 as a time at which the designated time serves as a reference position in the display area of the two-dimensional program table. For example, when "7" is input by the numeric key, the time converting part 107 outputs a set signal which sets "seven o'clock in the morning (7:00 a.m.) or seven o'clock in the afternoon (7:00 p.m.)" in the nearest future from a time of a program field displayed by the two-dimensional program table at the present as a time of a reference position on the two-dimensional program table.

When the signal representing the direction designation key is input from the remote control input analyzing part 105, the display area calculating part 108 calculates a position moved by one (for example, 1 hour or 1 channel) from a cursor position of the program field displayed by the two-dimensional program table at the present to a designated direction.

When a channel serving as the reference position in the display area of the two-dimensional program table is input from the channel converting part 106, the display area calculating part 108 calculates the display area such that the channel serves as the reference position of the display of the two-dimensional program table. For example, the display area of the two-dimensional program table is calculated to be a channel at the center position of a channel axis. When the time serving as the reference position in the display area of the two-dimensional program table is input from the time converting part 107, the display area calculating part 108 calculates the display area such that the time serves as a reference position of the display of the two-dimensional program table. For example, the display area of the two-dimensional program table is calculated to be an uppermost time of the time axis.

When a signal representing a date designated on the two-dimensional program table is input from the date converting part 111, for example, when a signal representing that the blue key is depressed is input, the display area calculating part 108 performs an arithmetic operation which sets the display area for the two-dimensional program table to the previous day. When a signal representing that the red key is depressed is input, the display area calculating part 108 performs an arithmetic operation which sets the display area for the two-dimensional program table to the next day.

The display area calculating part 108 outputs a signal representing the calculated display area for the two-dimensional program table to the program guide forming part 109.

The program guide forming part 109 receives program information accumulated and managed by the program information management part 104 to form a two-dimensional program table in response to the display area calculated by the display area calculating part 108. The program guide forming part 109 designates the display part 110 such that the two-dimensional program table displayed at the present on the display part 110 is switched to the newly formed two-dimensional program table to display the two-dimensional program table.

The display part 110 switches the two-dimensional program table displayed at the present to the new two-dimensional program table input from the program guide forming part 109 to display the new two-dimensional program table.

[Two-Dimensional Program Table by EPG Display Apparatus 100]

A two-dimensional program table formed and displayed by the EPG display device 100 according to the first embodiment of the present invention will be concretely described below with reference to FIGS. 3 and 4.

FIG. 3 is a diagram showing a concrete display screen of the electronic program guide (EPG) displayed on the display part 110 and a diagram in a channel jump mode. When a user depresses the program table key 203 (see FIG. 2) on the remote controller 200, the electronic program guide (EPG) shown in FIG. 3 is displayed from a normal television viewing state. The electronic program guide (EPG) is a two-dimensional program table, channels are arranged in the horizontal direction, and times are arranged in the vertical direction. In the two-dimensional program table, in a channel write area 301 of each channel, a number corresponding to each numeric key in the numeric key region 206 on the remote controller 200 is written.

FIG. 4 is a diagram showing a concrete display screen of the electronic program guide (EPG) displayed on the display part 110 and a diagram in a time jump mode. Channels are arranged in the horizontal direction, and times are arranged in the vertical direction. The display screen in the time jump mode is handled such that a number of a numeric key in the numeric key region 206 is directly replaced with a time. In a time display field of the two-dimensional program table, in a time write area 401 at each time, a number corresponding to each numeric key in the numeric key region 206 on the remote controller 200 is written.

In the two-dimensional program table displayed by the EPG display device according to the first embodiment, as shown in FIG. 3, the channel can be jumped along a channel axis direction by a key operation of the numeric key in the numeric key region 206. As shown in FIG. 4, the time can be jumped along a time axis direction by a key operation of the numeric key in the numeric key region 206.

Switching of the jump mode between the channel jump mode shown in FIG. 3 and the time jump mode shown in FIG. 4 is set such that the switching operation is performed each time the yellow key in the colored key region 202 is depressed.

When the display screen is set in the time jump mode, the numeric keys 1 to 12 generally allocated to the channels are applied to times from one o'clock (1:00) to twelve o'clock (12:00) in the morning or afternoon, respectively, and used. On the display screen of the two-dimensional program table in the time jump mode, it is displayed that <time jump mode> is set, and numbers of the corresponding numeric keys are displayed in the time write areas 401 at the times in the time display field set along the vertical time axis, respectively.

When the numeric key in the numeric key region 206 on the remote controller 200 is depressed, a time is jumped to the nearest future time from the time displayed at the present. An explanation will be made by the display screen shown in FIG. 4. In a state in which a time (uppermost time) displayed at the present is 20:00 (eight o'clock in the afternoon (8:00 p.m.)), when the numeric key "7" is depressed, the time is jumped to "7:00 a.m. on the next day". Further, when the numeric key "7" is depressed, the time is jumped to "7:00 p.m. on the next day". In this manner, in the two-dimensional program table displayed by the EPG display device according to the first embodiment of the present invention, when a target time for browsing is the future 12 hours after the present time, by operating the numeric key once, the display screen can be jumped to a display screen including a time desired to be necessarily browsed by a user by operating the numeric key twice even though the target time for browsing is the future 13 hours after to 24 hours after.

[Formation and Display of Two-Dimensional Program Table]

A flow of formation and display of the two-dimensional program table by the EPG display device 100 according to the first embodiment of the present invention will be described below with reference to FIG. 5.

Figure 5:
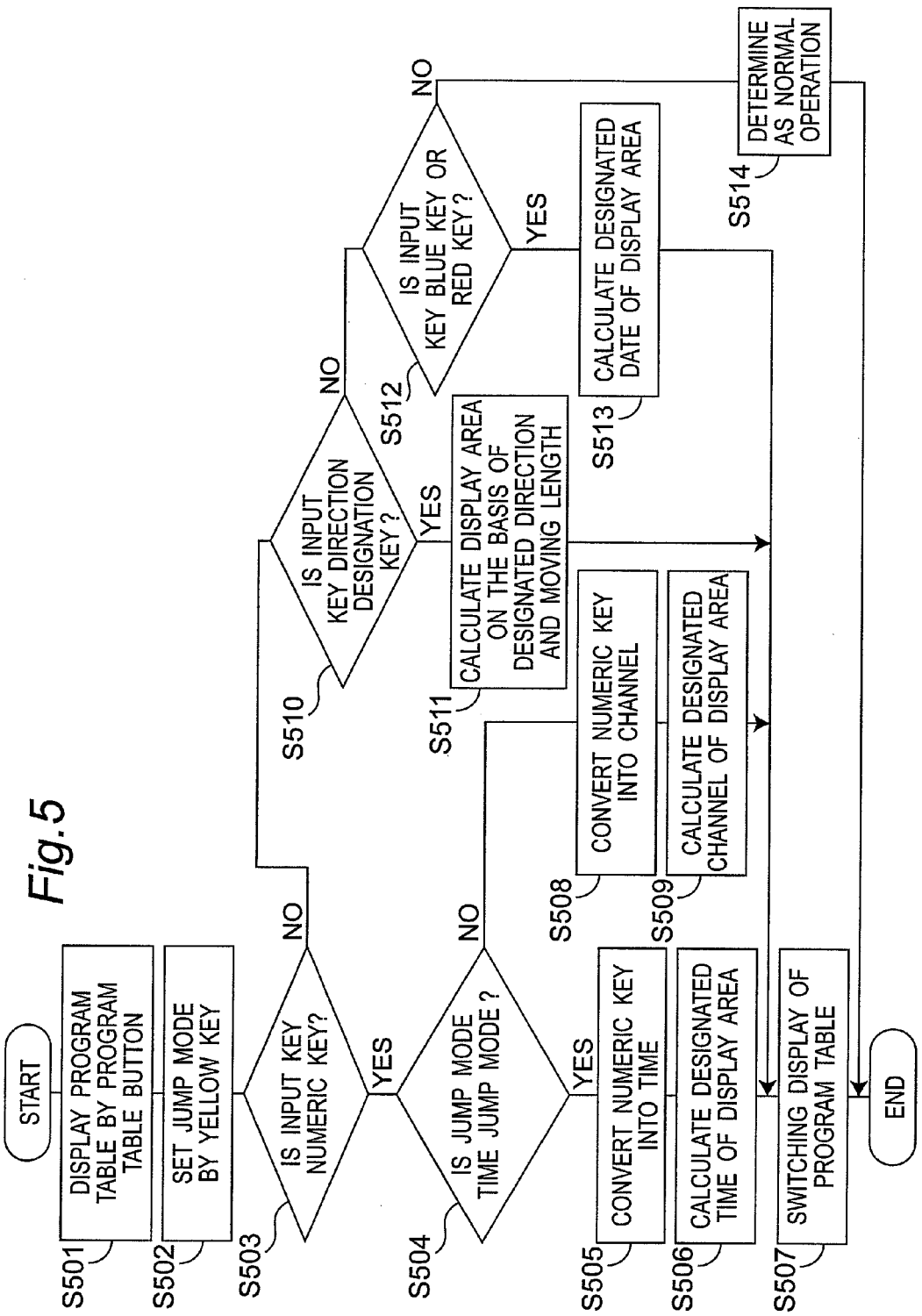
FIG. 5 is a flow chart to perform display switching of display areas of the two-dimensional program table in the electronic program guide display device according to the first embodiment.

FIG. 5 is a flow chart which displays the electronic program guide (EPG) by the EPG display device 100 according to the first embodiment and switches a display area to display contents to be calculated by a user.

When the user depresses the program table key 203 on the remote controller 200, a signal of a program table key-input is input to the EPG display device 100. As a result, the two-dimensional program table shown in FIG. 3 is displayed on the display part 110 of the EPG display device 100 (S501).

When a user depresses the yellow key in the colored key region 202 of the remote controller 200, a signal of the yellow key-input is input to the EPG display device 100, and the jump mode is set to the channel jump mode or the time jump mode (S502). As shown in FIG. 3, an initial set of the jump mode is the channel jump mode. Therefore, unless the yellow key is input again, the display screen is held in the channel jump mode. In the channel jump mode of the initial screen, when the yellow key is input once, the display screen is switched to the time jump mode shown in FIG. 4. Furthermore, each time, the yellow key is input, the jump mode is sequentially switched between the channel jump mode and the time jump mode.

In step S503, the remote control input analyzing part 105 analyzes whether a input key input from the remote controller 200 is a numeric key. When the input key is the numeric key, it is checked whether the jump mode set in step 502 is the time jump mode (S504).

When the jump mode is the time jump mode, the remote control input analyzing part 105 outputs a signal representing the number of the analyzed numeric key to the time converting part 107. The time converting part 107 converts the signal representing the number of the input numeric key into a signal representing a time (S505). The signal representing the time converted by the time converting part 107 is output to the display area calculating part 108. The display area calculating part 108 calculates a display area for the two-dimensional program table on the basis of the signal representing the input time (S506). The display area calculating part 108 outputs the calculated display area to the program guide forming part 109, and the program guide forming part 109 performs switching display of the two-dimensional program table displayed on the display part 110 (S507).

For example, as in the two-dimensional program table shown in FIG. 4, in the state of the time jump mode, when the numeric key "7" is depressed when a time displayed at the present is 20:00 (8:00 p.m.), the remote control input analyzing part 105 confirms that the number of the numeric key input from the remote controller 200 is "7" and that the jump mode is the time jump mode. The remote control input analyzing part 105 outputs a signal representing the numeric key "7" to the time converting part 107. The time converting part 107 converts the signal representing the input numeric key "7" into a signal representing "a time 7:00 a.m. on the next day". The time converting part 107 outputs the converted signal representing the "the time 7:00 a.m. on the next day" to the display area calculating part 108. The display area calculating part 108 calculates a display area for a two-dimensional program table on the basis of the input signal representing the "7:00 a.m. on the next day". The display area calculating part 108 outputs the calculated display area to the program guide forming part 109. The program guide forming part 109 performs switching display of the two-dimensional program table displayed on the display part 110.

When the jump mode is not the time jump mode in step 504, i.e., the channel jump mode is set, the remote control input analyzing part 105 outputs a signal representing a number of the analyzed numeric key to the channel converting part 106. The channel converting part 106 converts the input signal representing the number of the numeric key into a signal representing a corresponding channel (S508). The channel converting part 106 outputs the converted signal representing the corresponding channel to the display area calculating part 108. The display area calculating part 108 calculates a display area for the two-dimensional program table on the basis of the input signal representing the corresponding channel (S509). The display area calculating part 108 outputs the calculated display area to the program guide forming part 109. The program guide forming part 109 performs switching display of the two-dimensional program table displayed on the display part 110 (S507).

In step 503, when the input key from the remote controller 200 is not the numeric key, the remote control input analyzing part 105 analyzes whether the input key input from the remote controller 200 is the direction designation key 204 (S510). When the input key is the direction designation key 204, the remote control input analyzing part 105 outputs a signal representing the direction designated by the direction designation key and a moving length to the display area calculating part 108. The display area calculating part 108 calculates a display area on the two-dimensional program table on the basis of the signal representing any one of the upward, downward, leftward, and rightward directions designated by the direction designation key 204 and the moving length (S511). The display area calculating part 108 outputs a signal representing a moving direction and a moving length of a designated region in the calculated display area to the program guide forming part 109. The program guide forming part 109 performs switching display of the two-dimensional program table displayed on the display part 110 to move the designated region in the designated direction (S507).

In step 510, when the input key is not the direction designation key 204 representing the upward, downward, leftward, and rightward directions, it is determined whether the input key is the blue key or the red key in the colored key region 202 (S512). When the input key is the blue key, a display area on a designated date is calculated to jump the display screen to the display screen on the previous day. When the input key is the red key, a display area on a designated date is calculated to jump the display screen to the display screen on the next day (S513).

In step 512, when the input key is not the blue key or the red key in the colored key region 202, the remote control input analyzing part 105 determines that the input key is a normal operation of the remote controller 200 (S514).

In the EPG display device according to the first embodiment of the present invention configured as described above, the moment the yellow key is depressed on the program table display, the mode shifts to the jump mode, and a setting for the channel jump mode or the time jump mode is set. In the EPG display device according to the first embodiment, when a numeric key is input in the jump mode, depending on a state of the jump mode (channel jump mode or time jump mode), a program table representing a channel or a time corresponding to the number displayed by the numeric key is obtained. Therefore, in the EPG display device according to the first embodiment of the present invention, a cumbersome operation in a conventional electronic program guide display device in which any one of the keys representing the upward, downward, leftward, and rightward directions is continuously depressed to scroll the display area in a desired direction is not necessary, and a program required by a user can be instantaneously displayed on the screen by a simple operation.

In the EPG display device according to the first embodiment, when the jump mode held in the display area calculating part 108 is the time jump mode, when the numeric key is input in the numeric key region 206 of the remote controller 200, a display time is determined by the time converting part 107 for a numeric key input to make it possible to perform time jump along a time axis. Therefore, the configuration of the EPG display device according to the first embodiment can avoid a cumbersome operation of scrolling the display area to move the display area to a desired time by using the keys representing the upward, downward, leftward, and rightward directions.

In the EPG display device according to the first embodiment, the jump mode is set by the yellow key. However, the jump mode may be set by other key operations. Alternatively, a jump mode setting key is newly arranged on the remote controller 200.

In the first embodiment, a configuration in which the channel jump mode and the time jump mode serving as the jump modes are set by a key operation of the yellow key is explained. However, the present invention is not limited to the configuration. For example, since the display area calculating part 108 which manages the jump modes detects that the direction designation key 204 is operated, after the time is vertically moved, and the jump mode is moved to the time jump mode. After the channels are horizontally moved, the jump mode can also moved to the channel jump mode. In this manner, in the EPG display device according to the first embodiment of the present invention, by a scroll operation of the display screen in the upward, downward, leftward, or rightward direction, so that the jump modes can be automatically switched.

In the present invention, program information is multiplexed in not only a digital broadcast but also an analog broadcast. The present invention can be applied to any system which can display a program guide.

The present invention can be applied to not only a television broadcast but also to a case in which information of a program guide is acquired through the Internet. The present invention can be applied to not only a method of acquiring an electronic program guide but also any system which can display a two-dimensional program table.

Second Embodiment

An electronic program guide display device 600 (to be abbreviated as an EPG display device hereinafter) according to a second embodiment of the present invention will be described below with reference to FIGS. 6 to 8.

Figure 6:
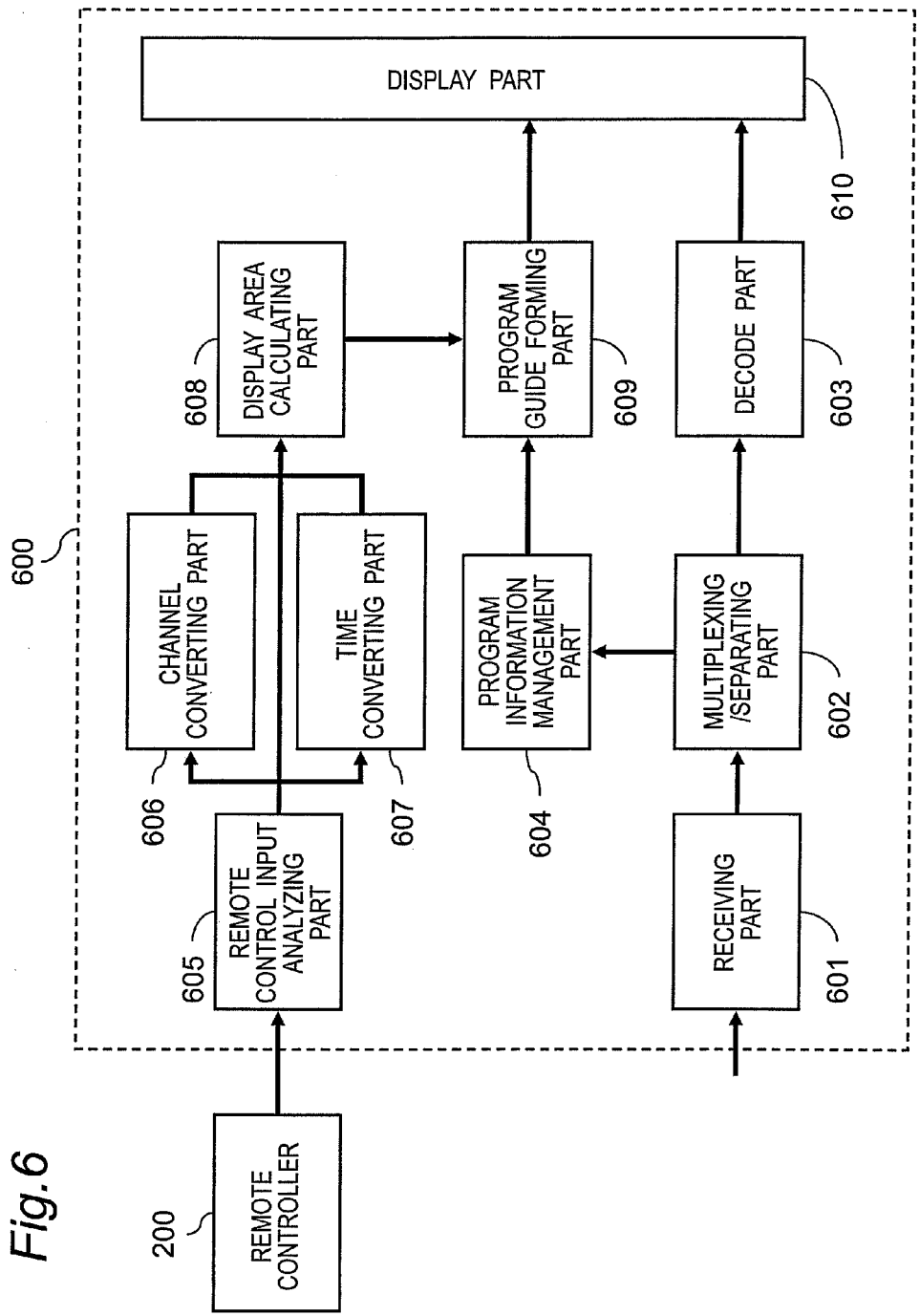
FIG. 6 is a block diagram showing a configuration of an electronic program guide display device (EPG display device) according to a second embodiment of the present invention.

FIG. 6 is a block diagram showing a configuration of an EPG display device according to the second embodiment of the present invention. The EPG display device 600 is made to avoid a cumbersome operation of scrolling a display field along a time axis on a screen display of a two-dimensional program table serving as an electronic program guide (EPG). The EPG display device 600 has a configuration in which, by a small number of key operations on a remote control unit (to be abbreviated as a remote controller hereinafter) 200, the display field is jumped along a time axis and a channel axis on the two-dimensional program table and instantaneously moved to a target program. FIG. 7 is a diagram showing a concrete display screen of an electronic program guide (EPG) displayed on a display part 610 and a diagram when a time jump panel 701 is superposed on the two-dimensional program table and displayed.

The EPG display device 600 according to the second embodiment is operated by a remote controller having a configuration which is substantially the same as that of the remote controller 200 described in the first embodiment. The same reference numerals as in the first embodiment denote parts having the same components in the second embodiment, a description thereof will be omitted. In the EPG display device 600 according to the second embodiment, the direction designation key 204 representing the upward, downward, left- ward, and rightward directions is used not only to move a cursor on the two-dimensional program table but also to input a time of a destination of jump when the cursor is jumped on the two-dimensional program table.

[Configuration of EPG Display Apparatus 600]

The EPG display device 600 according to the second embodiment has a receiving part 601, a multiplexing/separating part 602, a decode part 603, a program information management part 604, a remote control input analyzing part 605, a channel converting part 606, a time converting part 607, a display area calculating part 608, a program guide forming part 609, and a display part 610.

In the EPG display device 600 according to the second embodiment, the receiving part 601 receives a multiplexed stream of a digital broadcast. The multiplexing/separating part 602 separates the multiplexed stream input from the receiving part 601 into program information serving as digital video information, digital audio information, and service information. The program information includes information representing program contents, channel information, time information, and the like. The decode part 603 decodes the digital video information and the digital audio information input from the multiplexing/separating part 602. The program information management part 604 extracts program information from the information separated by the multiplexing/separating part 602 and accumulates and manages the program information in all time zones of all the channels.

The remote control input analyzing part 605 connected to the remote controller 200 such that a signal can be transmitted to the remote controller 200 analyzes a key input signal from the remote controller 200 operated by a user with keys. On the basis of the analysis result, the remote control input analyzing part 605 selects an output destination of the key input signal. More specifically, the remote control input analyzing part 605 analyzes a type of an input key on the remote controller 200 and analyzes whether the time jump panel 701 (see FIG. 7) (will be described later) is displayed on the two-dimensional program table to determine the output destination.

When an analysis result of the remote control input analyzing part 605 is a numeric key, the channel converting part 606 converts a signal representing a number of a numeric key input from the remote control input analyzing part 605 into a signal representing a corresponding channel.

When the analysis result of the remote control input analyzing part 605 is the direction designation key, and when the time jump panel 701 is displayed, the time converting part 607 converts the signal representing the direction designation key-input from the remote control input analyzing part 605 into a signal representing a corresponding time.

When the key operation by a user on the remote controller 200 is the direction designation key representing the upward, downward, leftward, and rightward moving directions or a key-input related to a screen display regardless of channel conversion or time conversion, a signal representing the direction or the screen display is output from the remote control input analyzing part 605 to the display area calculating part 608.

When an analysis result of the remote control input analyzing part 605 is the direction designation key, and when the time jump panel 701 is not displayed, the display area calculating part 608 calculates a scroll direction of a display area for a two-dimensional program table on the basis of the direction designated by the direction designation key-input from the remote control input analyzing part 605. The display area calculating part 608 calculates the display area for the two-dimensional program table on the basis of a signal representing a channel or a time input from the channel converting part 606 or the time converting part 607.

The program guide forming part 609 forms a two-dimensional program table on the bases of a calculation result from the display area calculating part 608 in response to necessary information from the program information management part 604. The display part 610 displays a video image by the decoded video information and the decoded audio information input from the decode part 603, or displays the two-dimensional program table input from the program guide forming part 609.

[Operation of EPG Display Apparatus 600]

Operations of components in the EPG display device 600 performed until switching display of a two-dimensional program table is performed on the display part 610 after the key operation on the remote controller 200 will be described below in detail.

When a user performs a key operation on the remote controller 200, the remote control input analyzing part 605 analyzes whether any one of the keys is operated on the basis of the signal representing the key-input from the remote controller 200. More specifically, the remote control input analyzing part 605 analyzes whether, as a type of a key-input, any one of key signals of the yellow key representing the time jump panel 701, the direction designation key to move a cursor position on the two-dimensional program table one by one (by the hour or in units of channels), the direction designation key to jump a time, the numeric key to jump a channel on the two-dimensional program table, the return key to eliminate the time jump panel 701, and other keys is input.

When an analysis result of the input key from the remote controller 200 is the yellow key, the remote control input analyzing part 605 notifies the program guide forming part 609 of inputting of the yellow key through the display area calculating part 608. The program guide forming part 609 notified of the inputting of the yellow key displays the time jump panel 701 (see FIG. 7) such that the time jump panel 701 is superposed on the display screen of the two-dimensional program table.

When the analysis result of the input key from the remote controller 200 is the direction designation key, and when the time jump panel 701 is displayed on the two-dimensional program table, the remote control input analyzing part 605 outputs the signal representing the direction designated by the direction designation key to the time converting part 607. When the time jump panel 701 is not displayed on the display screen, the remote control input analyzing part 605 directly outputs the signal representing the direction designated by the direction designation key to the display area calculating part 608.

The time converting part 607 converts the signal representing the direction designated by the direction designation key-input from the remote control input analyzing part 605 into a signal representing a corresponding time. A signal of the converted time which is a time serving as a reference position of the display of the two-dimensional program table is output to the display area calculating part 608. For example, when the "rightward direction" is input by the direction designation key, the nearest future "3:00 a.m. or p.m." from a time of a program field displayed by the two-dimensional program table at the present is set to be a time of the reference position of the two-dimensional program table.

When the display area calculating part 608 receives a signal representing the direction designation key from the remote control input analyzing part 605, the display area calculating part 608 calculates a display area obtained by moving a cursor position of the program field displayed on the two-dimensional program table at the present in a designated one of the upward, downward, leftward, and rightward directions by one (by the hour or in units of channels). When a signal representing the channel serving as the reference position of the display of the two-dimensional program table is input from the channel converting part 606, the display area is calculated such that the channel serves as the reference position of the display of the two-dimensional program table. For example, the display area of the two-dimensional program table is calculated such that the designated channel serving as a channel at a center position on the channel axis of the display area. When the time serving as the reference position on the time axis in the display area for the two-dimensional program table is input from the time converting part 607, the display area calculating part 608 calculates the display area such that the time serves as the reference position of the display of the two-dimensional program table. For example, the display area for the two-dimensional program table is calculated such that the designated time is an uppermost time on the time axis. The display area calculating part 608 outputs the signal representing the calculated display area for the two-dimensional program table to the program guide forming part 609.

The program guide forming part 609 receives the program information accumulated and managed by the program information management part 604 to form a two-dimensional program table in response to the display area calculated by the display area calculating part 608. The program guide forming part 609 designates the display part 610 such that the two-dimensional program table displayed at the present on the display part 610 is switched to the newly formed two-dimensional program table to display the two-dimensional program table.

The display part 610 switches the two-dimensional program table displayed at the present to the new two-dimensional program table input from the program guide forming part 609 to display the new two-dimensional program table.

[Two-Dimensional Program Table by EPG Display Apparatus 600]

A two-dimensional program table formed and displayed by the EPG display device 600 according to the second embodiment of the present invention will be concretely described below with reference to FIG. 7. FIG. 7 is a diagram showing a concrete display screen of the electronic program guide (EPG) displayed on the display part 610. FIG. 7 is a diagram obtained when a time jump panel 701 is displayed to be superposed on a display screen of two-dimensional program table serving as the electronic program guide (EPG).

Figure 7:
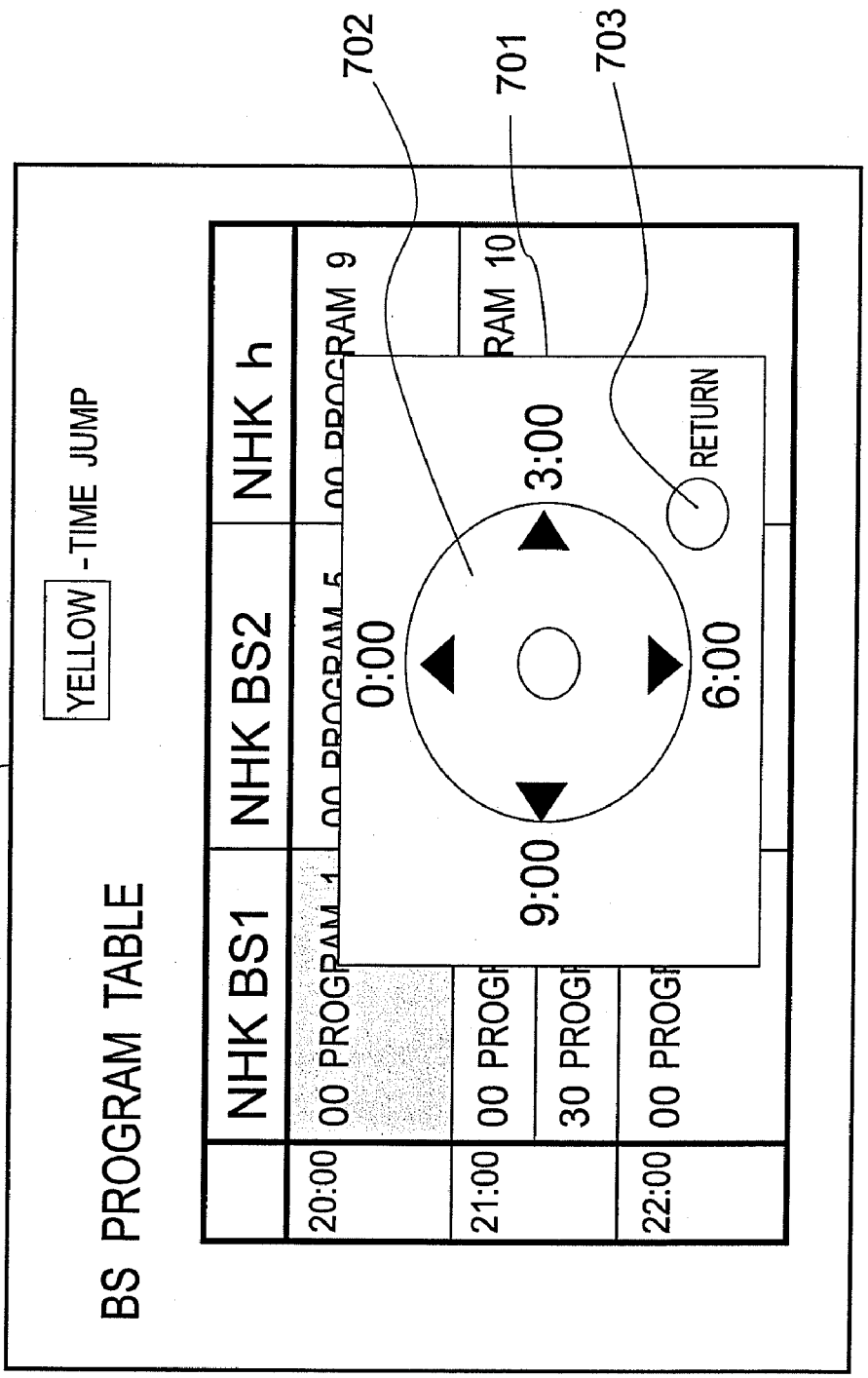
FIG. 7 is a diagram of a display screen of a two-dimensional program table when a time jump panel is being displayed in the electronic program guide display device according to the second embodiment.

As shown in FIG. 7, on the time jump panel 701, a direction designation key 702 having the same shape as that of the direction designation key 204 of the remote controller 200 is displayed. The direction designation key 702 is obtained by imitating an analog clock, times are displayed from side to side and up and down. More specifically, the second embodiment uses that the circular direction designation key 204 on the remote controller 200 can suggest the shape of an analog clock. As indicated by the direction designation key 702 of the time jump panel 701, one of the upward, downward, leftward, and rightward directions on the direction designation key 204 of the remote controller 200 indicate a time representing a short hand of the clock. More specifically, the upward key indicates "0:00 a.m. or 0:00 p.m.", the rightward key indicates "3:00 a.m. or 3:00 p.m.", the downward key indicates "6:00 a.m. or 6:00 p.m.", and the leftward key indicates "9:00 a.m. or 9:00 p.m.".

Therefore, the time jump panel 701 fulfills a roll of a Remote control guide. On the time jump panel 701, a return key 703 is displayed at the same position as that of the remote controller 200. When the return key 205 of the remote controller 200 is depressed, the time jump panel 701 is eliminated from the display screen.

In the EPG display device according to the second embodiment of the present invention described above, the direction designation key 204 has not only a function of moving a cursor on the two-dimensional program table one by one (by the hour or in units of channels) in a designated direction but also a function that can perform time jump by the yellow key of the remote controller 200 along a time axis direction in the display of the time jump panel 701 shown in FIG. 7. In the second embodiment, within 5 seconds after the time jump panel 701 is displayed, the EPG display device waits for an input from the direction designation key 204. If there is no input of the direction designation key 204 within the 5 seconds, the time jump panel 701 is eliminated from the display screen. When an input to designate a time is performed by the direction designation key 204 within 5 seconds after the time jump panel 701 is displayed, a time jump is executed. The EPG display device waits for an input of the direction designation key 204 within 5 minutes after the time jump is executed, so that the time jump to the further future can be executed.

When the cursor can be moved to target date and time by the direction designation key 204, the time jump panel 701 prevents the two-dimensional program table from being browsed. For this reason, by depressing the return key 205, the time jump panel 701 can be eliminated.

When the direction designation key 204 of the remote controller 200 is depressed, time jump from a time displayed at the present to the nearest future time. When the display screen shown in FIG. 7 will be described below with reference to FIG. 7. In a state in which a time displayed at the present is 20:00 (8:00 p.m.), when the downward key of the direction designation key 204 is operated, the time is jumped to a time "6:00 a.m. on the next day". Furthermore, when the downward key of the direction designation key 204 is operated, time jump to "6:00 p.m. on the next day" is performed. Since the key operation is performed as described above, on the electronic program guide (EPG) by the EPG display device 600 according to the second embodiment, by using the direction designation key 204 used in normal scrolling, when a target time desired to be browsed by a user is a future time after a maximum of 12 hours or less, the time can be jumped to a program table including the target time by inputting the direction designation key 204 once. Even though the target time is a future time from a minimum of 13 hours to a maximum of 24 hours, the time can be jumped to the program table including the target time by inputting the direction designation key 204 twice.

[Formation and Display of Two-Dimensional Program Table]

A flow of formation and display of an electronic program guide (EPG) by the EPG display device 600 according to the second embodiment of the present invention will be described below with reference to FIG. 8.

Figure 8:
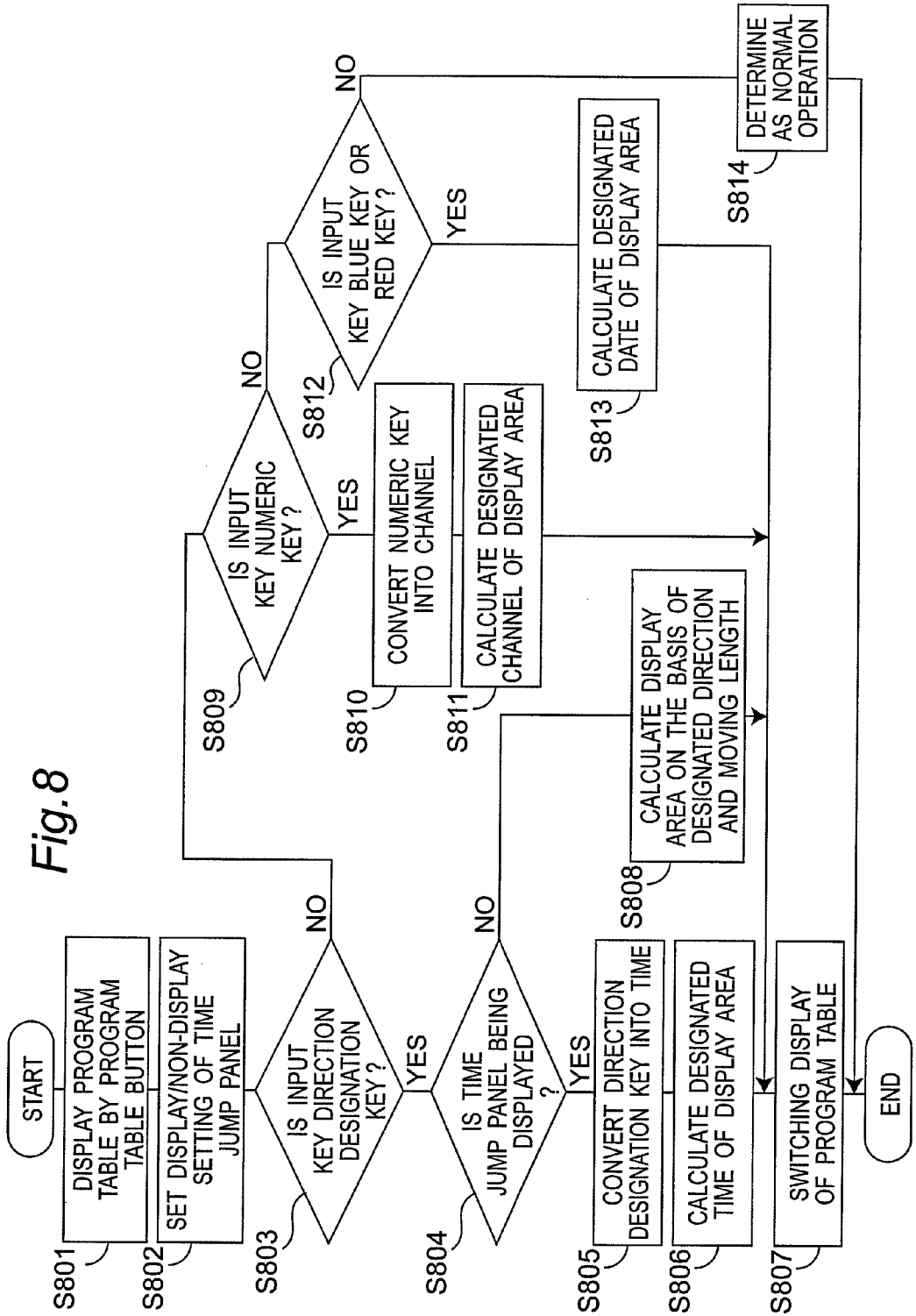
FIG. 8 is a flow chart to perform display switching of display areas of a two-dimensional program table in the electronic program guide display device according to the second embodiment.

FIG. 8 is a flow chart in which a two-dimensional program table serving as the electronic program guide (EPG) is displayed by the EPG display device 600 according to second embodiment, and a display area is switched to display contents to be calculated by a user.

When the user depresses the program table key 203 (see FIG. 2) of the remote controller 200, a signal of a program table key-input is input to the EPG display device 600. As a result, a two-dimensional program table is displayed on the display part 610 of the EPG display device 600 (S801).

In the state in which the two-dimensional program table is displayed, the yellow key in the colored key region 202 of the remote controller 200 is operated to set display of the time jump panel 701, or non-display of the time jump panel 701 is set by operating the return key 205 (S802).

When a two-dimensional program table is displayed by a program table key-input for the first time, the time jump panel 701 is not displayed. When the yellow key is input, as shown in FIG. 7, the time jump panel 701 is displayed. While the time jump panel 701 is being displayed, the time jump panel 701 can be eliminated by an operation of the return key 205 of the remote controller 200.

In a state in which the two-dimensional program table is displayed, the remote control input analyzing part 605 analyzes whether a type of a key-input from the remote controller 200 is the direction designation key 204 (S803). When the input key is the direction designation key 204, it is checked whether the time jump panel 701 set in step 802 is being displayed (S804). When the time jump panel 701 is displayed, the remote control input analyzing part 605 outputs a signal representing the direction designated by the direction designation key 204 to the time converting part 607. The time converting part 607 converts the signal representing the input direction into a signal representing a corresponding time (S805). A signal representing the time converted by the time converting part 607 is output to the display area calculating part 608. The display area calculating part 608 calculates a display area for the two-dimensional program table on the basis of the input signal representing the time (S806). The display area calculating part 608 outputs the calculated display area to the program guide forming part 609. The program guide forming part 609 performs switching display of the two-dimensional program table displayed on the display part 610 (S807).

For example, as shown in the two-dimensional program table shown in FIG. 7, when the time jump panel 701 is being displayed, the time displayed at the present is 20:00 (8:00 p.m.). When the downward key of the direction designation key 204 is depressed, the remote control input analyzing part 605 confirms that the input key is the downward key of the direction designation key 204 and confirms that the time jump pane is being displayed. The remote control input analyzing part 605 outputs the signal representing the downward key to the time converting part 607, and the time converting part 607 converts the input signal representing the downward key into a signal representing a time "6:00 a.m. on the next day". The time converting part 607 converts outputs the converted signal representing the time "6:00 a.m. on the next day" to the display area calculating part 608. The display area calculating part 608 calculates a display area for the two-dimensional program table on the basis of the input signal representing the time "6:00 a.m. on the next day". The display area calculating part 608 outputs the calculated display area to the program guide forming part 609. The program guide forming part 609 performs switching display of the two-dimensional program table displayed on the display part 610.

When the time jump panel 701 is not displayed in step 804, i.e., in a normal display state of the two-dimensional program table serving as an electronic program guide, the remote control input analyzing part 605 outputs a direction designated by the direction designation key 204 and a moving length to the display area calculating part 608. The display area calculating part 608 calculates a display area for the two-dimensional program table on the basis of the direction designated by the direction designation key 204 and the moving length (S808). The display area calculating part 608 outputs the moving direction of the display area calculated by the display area calculating part 608 and the moving length to the program guide forming part 609. The program guide forming part 609 which receives the moving direction and the moving length of the display area performs switching display of the two-dimensional program table displayed on the display part 610 (S807).

When the input key is not the direction designation key 204 in step 803, the remote control input analyzing part 605 analyzes whether the input key input from the remote controller 200 is the numeric key (S809). When the input key is the numeric key, the signal representing the number of the numeric key is output to the channel converting part 606. The channel converting part 606 converts the signal representing the number of the input numeric key into a signal representing a channel (S810). The signal representing the channel converted by the channel converting part 606 is output to the display area calculating part 608. The display area calculating part 608 calculates a display area for the two-dimensional program table on the basis of the input signal representing the channel (S811). The display area calculating part 608 outputs the calculated display area to the program guide forming part 609, and the program guide forming part 609 switches the two-dimensional program table displayed on the display part 610 (S807).

When the input key is not the numeric key in step 809, it is determined whether the input key is the blue key or the red key serving as the colored key region 202 (S812). When the input key is the blue key, a display area on a designated date is calculated to jump the display screen to the display screen on the previous day. When the input key is the red key, the display area of the designated date is calculated to jump the display screen to the display screen on the next day (S813). In step 812, when the input key is not the blue key or the red key in the colored key region 202, the remote control input analyzing part 605 determines that the input key is a normal operation of the remote controller 200 (S814).

In the EPG display device according to the second embodiment of the present invention configured as described above, in a state in which the time jump panel 701 is displayed, when a key-input representing a direction is performed by the direction designation key 204 of the remote controller 200, a program table of time jump can be displayed. Therefore, in the EPG display device according to the second embodiment of the present invention, a cumbersome operation of scrolling a display area in a desired direction by continuously depressing a key representing any one of the upward, downward, leftward, and rightward directions in a conventional electronic program guide display device is unnecessary, and the time jump is instantaneously performed by a simple operation to make it possible to display the program desired by a user, so that desired screen display can be performed.

In the description of the EPG display device according to the second embodiment, the time jump panel 701 is configured to be displayed by a yellow key operation. The time jump panel 701 may be configured to be displayed by another key operation. A key which performs only display of the time jump panel 701 may be newly arranged on the remote controller 200.

In the EPG display device according to the second embodiment, the time jump panel 701 is described to be superposed on a television field of the two-dimensional program table and largely displayed as an example. The time jump panel 701 may be displayed not to be superposed on the television field. Alternatively, the time jump panel 701 may be translucently displayed, and the television field may be configured to be browsed even during an operation of the time jump panel 701.

In the EPG display device according to the second embodiment, the time jump panel 701 is configured such that the time is jumped to the nearest future time. However, for example, the time jump panel 701 may be configured such that the time is jumped in only the date displayed at the present. More specifically, when the date and time displayed at the present are 7:00 a.m. on the 30th, each time the leftward key is depressed while the time jump panel 701 is displayed, 9:00 a.m. on the 30th→9:00 p.m. on the 30th→9:00 a.m. on the 30th→9:00 p.m. on the 30th, i.e., the program table at 9:00 a.m. and the program table at 9:00 p.m. may be repeatedly displayed in the same 30th.

In the two-dimensional program guide (EPG) in which the colored key region 202 or the like of the remote controller 200 has a function of moving a date, the time jump panel 701 may be necessarily displayed when the date is moved.

The EPG display device according to the second embodiment is configured such that a time for displaying a two-dimensional program table is determined by the key representing one of the upward, downward, leftward, and rightward directions designated by the direction designation key 204 of the remote controller 200. However, in the EPG display device according to the present invention, a rotating key which rotates by 360° may also be used. In this case, a time for displaying two-dimensional program table can be determined by a rotating angle of the rotating key. For example, 360° are regarded as 12 hours, and the time may be changed into 1:00, 2:00, 3:00, . . . , each time the rotating key is rotated by 30° from the position of 0:00 (12:00).

In the EPG display device according to the present invention, when a rotating key rotated by 360° is used, a rotating angle represented by the rotating key may be set to a time advanced from a program of the two-dimensional program table displayed at the present. In this case, for example, the rotating key is rotated 360°, a two-dimensional program table at a time 12 hours ago is displayed. Each time the rotating key is rotated by 30°, the time may advance to a future time, i.e., a time 1 hour after, a time 2 hours after, and a time 3 hours after the time displayed at the present. When the rotating key is reversely rotated, each time the rotating key is rotated by 30°, the time may be returned to a past time 1 hour before, 2 hours before, and 3 hours before the time displayed at the present.

Third Embodiment

An electronic program guide display device (to be abbreviated as an EPG display device hereinafter) 900 according to a third embodiment of the present invention will be described below with reference to FIGS. 9 to 11.

Figure 9:
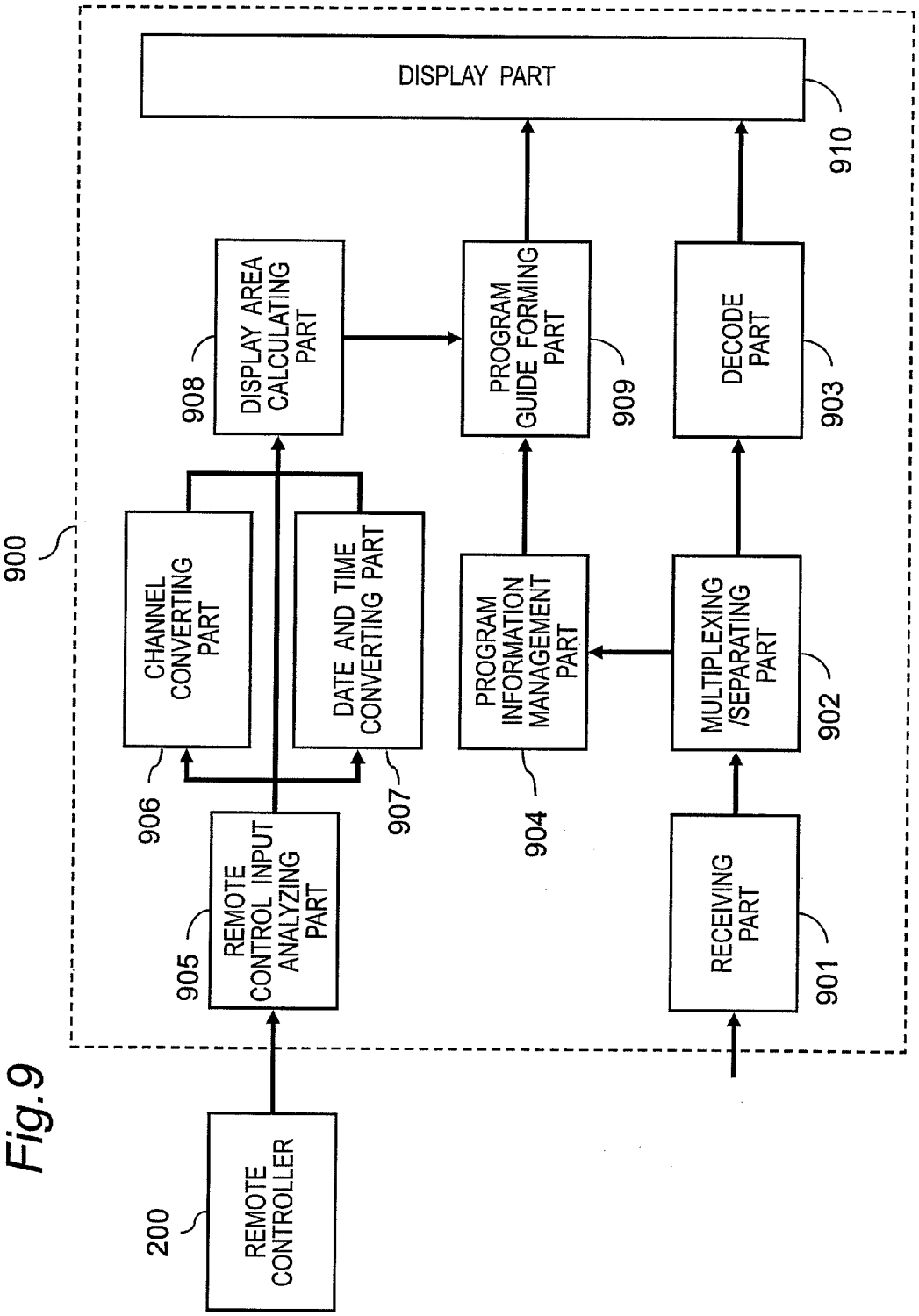
FIG. 9 is a block diagram showing a configuration of an electronic program guide display device in an electronic program guide display device (EPG display device) according to a third embodiment of the present invention.

FIG. 9 is a block diagram showing a configuration of the EPG display device 900 according to the third embodiment of the present invention. The EPG display device 900 is made to avoid a cumbersome operation of perform scrolling along a time axis on a screen display of the two-dimensional program table. The EPG display device 900 has a configuration in which a display field can be jumped along a time axis and a channel axis on the two-dimensional program table by a small number of operations on a remote control unit (to be abbreviated as a remote controller hereinafter) 200 to instantaneously move to a target program.

Figure 10:
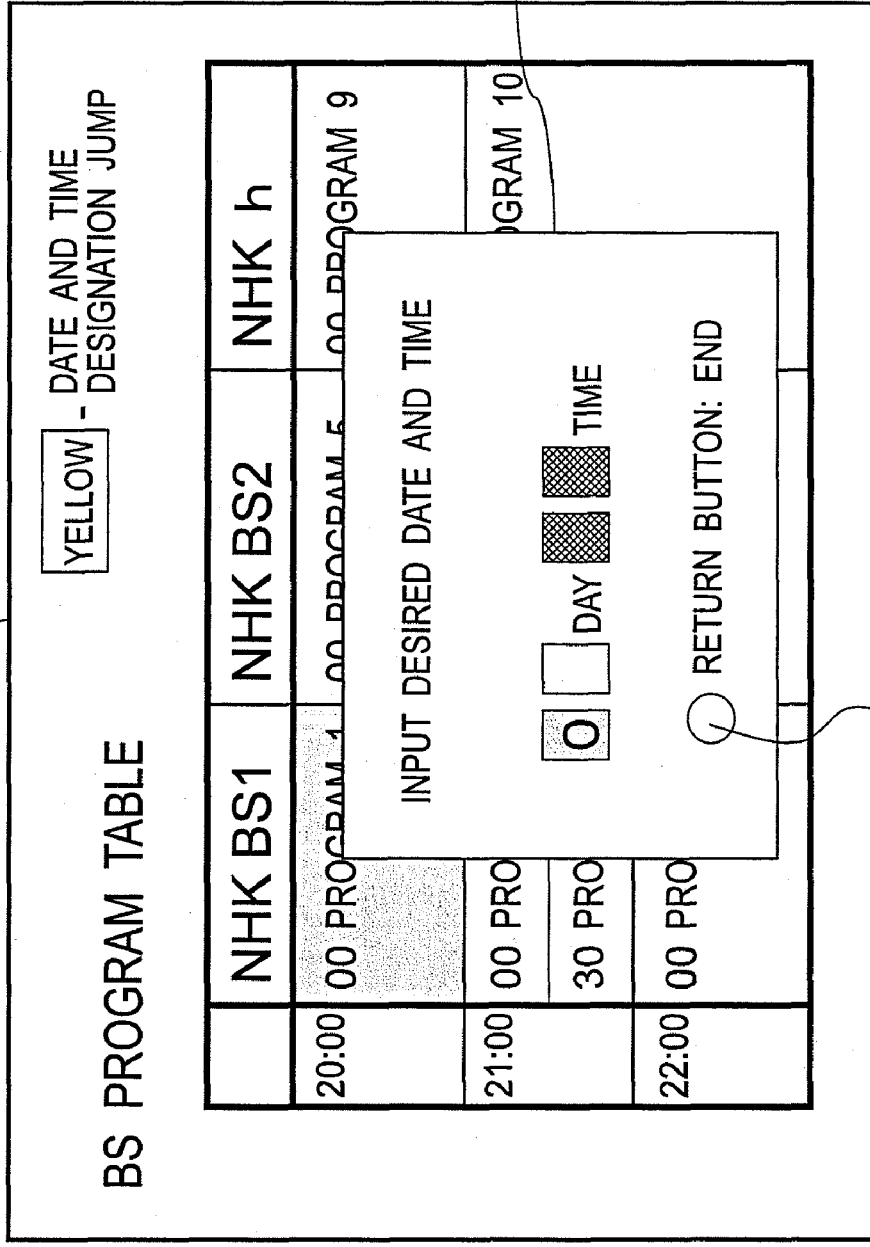
FIG. 10 is a diagram of a display screen of a two-dimensional program table when a date input panel is being displayed in the electronic program guide display device according to the third embodiment.

FIG. 10 is a diagram showing a concrete display screen of the electronic program guide (EPG) displayed on the display part 910 in the EPG display device 900 according to the third embodiment, and a diagram obtained when a date and time input panel 1001 is displayed to be superposed on a two-dimensional program table.

The EPG display device 900 according to the third embodiment is operated by a remote controller having a configuration which is substantially the same as that of the remote controller 200 described in the first embodiment. The same reference numerals as in the first embodiment denote parts having the same components in the third embodiment, a description thereof will be omitted.

In the EPG display device 900 according to the third embodiment, a numeric key in a numeric key region 206 of the remote controller 200 is used not only for a key-input to perform jump along a channel axis of the two-dimensional program table but also for inputting a date and time of a jump destination to perform jump along a time axis.

[Configuration of EPG Display Apparatus 900]

The EPG display device 900 according to the third embodiment has a receiving part 901, a multiplexing/separating part 902, a decode part 903, a program information management part 904, a remote control input analyzing part 905, a channel converting part 906, a date and time converting part 907, a display area calculating part 908, a program guide forming part 909, and a display part 910.

In the EPG display device 900 according to the third embodiment, as in the first embodiment or the second embodiment described above, the receiving part 901 receives a multiplexed stream of a digital broadcast. The multiplexing/separating part 902 separates the multiplexed stream input from the receiving part 901 into arbitrary program information serving as digital video information, digital audio information, and service information. The program information includes information representing program contents, channel information, time information, and the like. The decode part 903 decodes the digital video information and the digital audio information input from the multiplexing/separating part 902. The program information management part 904 extracts program information from the service information separated by the multiplexing/separating part 902 and accumulates and manages the program information in all time zones of all the channels.

The remote control input analyzing part 905 connected to the remote controller 200 such that a signal can be transmitted to the remote controller 200 analyzes a key input signal from the remote controller 200 operated by a user with keys. On the basis of the analysis result, the remote control input analyzing part 905 selects an output destination of the key input signal. More specifically, the remote control input analyzing part 905 selects an output destination by a type of an input key and checking whether the date and time input panel 1001 (to be described later) to perform jump along a time axis of the two-dimensional program table is displayed.

When an analysis result of the remote control input analyzing part 905 is a numeric key, and when a date and time input panel 1101 (to be described later) is not displayed, the channel converting part 906 converts a signal represented by a numeric key input from the remote control input analyzing part 905 into a signal represented by a corresponding channel. On the other hand, when the analysis result of the remote control input analyzing part 905 is the numeric key, and when the date and time input panel 1001 is being displayed, the date and time converting part 907 converts a signal representing the numeric key input from the remote control input analyzing part 905 into a signal representing a designated date and time.

When the analysis result of the remote control input analyzing part 905 is the direction designation key, and when the date and time input panel 1101 is not displayed, the display area calculating part 908 determines a direction designated by the direction designation key-input from the remote control input analyzing part 905 as a scroll direction of a display area of the two-dimensional program table to calculate the position of the display area. Alternatively, the display area calculating part 908 calculates a display area for the two-dimensional program table on the basis of a signal representing a channel or a date and time input from the channel converting part 906 or the date and time converting part 907.

The program guide forming part 909 forms a two-dimensional program table on the basis of the calculation result from the display area calculating part 908 in response to necessary information from the program information management part 904. The display part 910 displays a video image by the decoded video information and the decoded audio information input from the decode part 903, or displays the two-dimensional program table input from the program guide forming part 909.

[Operation of EPG Display Apparatus 900]

Operations of components in the EPG display device 900 performed until switching display of a two-dimensional program table is performed on the display part 910 after the key operation on the remote controller 200 will be described below in detail.

When a user performs a key operation on the remote controller 200, the remote control input analyzing part 905 analyzes whether any one of the keys is operated on the basis of the signal representing the key-input from the remote controller 200. More specifically, the remote control input analyzing part 905 analyzes whether, as a type of a key-input, any one of key signals of the yellow key to display the date and time input panel 1001, the direction designation key to move a cursor position on the two-dimensional program table one by one (by the hour or in units of channels), the numeric key to jump a channel along a channel axis on the two-dimensional program table, the numeric key to input a date and time to the date and time input panel 1001, the return key to eliminate the date and time input panel 1001, and other keys is input.

When an analysis result of the input key from the remote controller 200 is the yellow key, the remote control input analyzing part 905 notifies the program guide forming part 909 of inputting of the yellow key through the display area calculating part 908. The program guide forming part 909 notified of the inputting of the yellow key displays the date and time input panel 1001 (see FIG. 10) such that the date and time input panel 1001 is superposed on the display screen of the two-dimensional program table.

When the analysis result of the input key from the remote controller 200 is the numeric key, and when the date and time input panel 1001 is displayed on the two-dimensional program table, the remote control input analyzing part 905 outputs the signal representing a number designated by the numeric key to the date and time converting part 907. When the date and time input panel 1001 is not displayed on the display screen, the remote control input analyzing part 905 outputs the signal representing the number designated by the numeric key to the channel converting part 906.

In the date and time converting part 907, it is assumed that the number designated by the numeric key input from the remote control input analyzing part 905 includes a two-digit numeric value representing a date and a two-digit numeric value (display in a 24-hour system) representing a time, date and time is determined. The date and time converting part 907 outputs a signal representing the four determined numeric values to the display area calculating part 908 as a time serving as a reference position of the display of the two-dimensional program table. For example, when the input numeric keys are "1", "2", "0", and "8", the date and time converting part 907 recognizes 8:00 a.m. on twelfth and outputs a signal representing the numeric values to the display area calculating part 908.

When a signal representing a direction designation key is input from the remote control input analyzing part 905 once, the display area calculating part 908 calculates a display area in which a cursor position of a program field displayed by the two-dimensional program table at the present is moved by one (by the hour or in units of channels) in a designated direction of the upward, downward, leftward, and rightward.

When a signal representing a channel serving as a reference position of the display of the two-dimensional program table is input from the channel converting part 906, a display area is calculated such that the channel serves as the reference position of the display of the two-dimensional program table. For example, the display area for the two-dimensional program table is calculated such that the designated channel is a channel at a center position on the channel axis of the display area.

When a signal representing a time serving as the reference position of the display of the two-dimensional program table is input from the date and time converting part 907, a display area is calculated such that the time serves as the reference position of the display of the two-dimensional program table. For example, the display area for the two-dimensional program table is calculated such that the designated time is an uppermost time on the time axis of the two-dimensional program table. The display area calculating part 908 outputs the calculated display area of the two-dimensional program table to the program guide forming part 909.

The program guide forming part 909 receives the program information accumulated and managed by the program information management part 904 to form a two-dimensional program table in response to the display area calculated by the display area calculating part 908. The program guide forming part 909 designates the display part 910 such that the two-dimensional program table displayed at the present on the display part 910 is switched to the newly formed two-dimensional program table to display the two-dimensional program table.

The display part 910 switches the two-dimensional program table displayed at the present to the new two-dimensional program table input from the program guide forming part 909 to display the new two-dimensional program table.

[Two-Dimensional Program Table by EPG Display Apparatus 900]

A two-dimensional program table serving as an electronic program guide (EPG) formed and displayed by the EPG display device 900 according to the third embodiment of the present invention will be concretely described below with reference to FIG. 10. FIG. 10 is a diagram showing a concrete display screen of the two-dimensional program table displayed on the display part 910. FIG. 10 is a diagram obtained when a date and time input panel 1001 is displayed to be superposed on display screen of the two-dimensional program table.

As shown in FIG. 10, on the date and time input panel 1001, in order to perform jump along a time axis on the two-dimensional program table by a numeric key, a date input field and a time input field are displayed to input a 2-digit date and a 2-digit time. Upon completion of inputting of a 4-digit number on the date and time input panel 1001, the display area calculating part 908 calculates a designated time axis and updates the two-dimensional program table on the display part 910. At this time, the date and time input panel 1001 is eliminated from the display area.

In general, information of an electronic program guide (EPG) has information for 8 days including information on the present date, and does not have information subsequent to the information for the 8 days. The information of the electronic program guide does not include information subsequent to the present time. Therefore, the EPG display device according to the third embodiment of the present invention has only the information for the 8 days including the information on the present date. For this reason, in the EPG display device according to the third embodiment, when a date except for 8 days after the present date is input, a setting is performed not to accept the input. Since the date falls within only a range of 1st to 31st, the date field of the date and time input panel 1001 is set not to receive a number larger than 32. Since a time falls within only the range of 0:00 to 24:00, a time input field is set not to receive a number larger than 25.

When the information of the electronic program guide (EPG) has information of a number of days which is equal to or larger than 8 days, the EPG display device according to the present invention is configured in accordance with the number of days.

In the state in which the date and time input panel 1001 is displayed, when date and time jump is ended, the date and time input panel 1001 can be eliminated by the return key 205 on the remote controller 200.

The EPG display device according to the third embodiment of the present invention has a configuration in which a cursor on the two-dimensional program table can be moved one by one (by the hour or in units of channels) by the direction designation key 204 and, as shown in FIG. 10, the date and time input panel 1001 is displayed by the yellow key in the colored key region 202 on the remote controller 200 to make it possible to easily jump a time to an arbitrary time on an arbitrary date.

[Formation and Display of Two-Dimensional Program Table]

A flow of formation and display of a two-dimensional program table serving as an electronic program guide (EPG) by the EPG display device 900 according to the third embodiment of the present invention will be described below with reference to FIG. 11.

Figure 11:
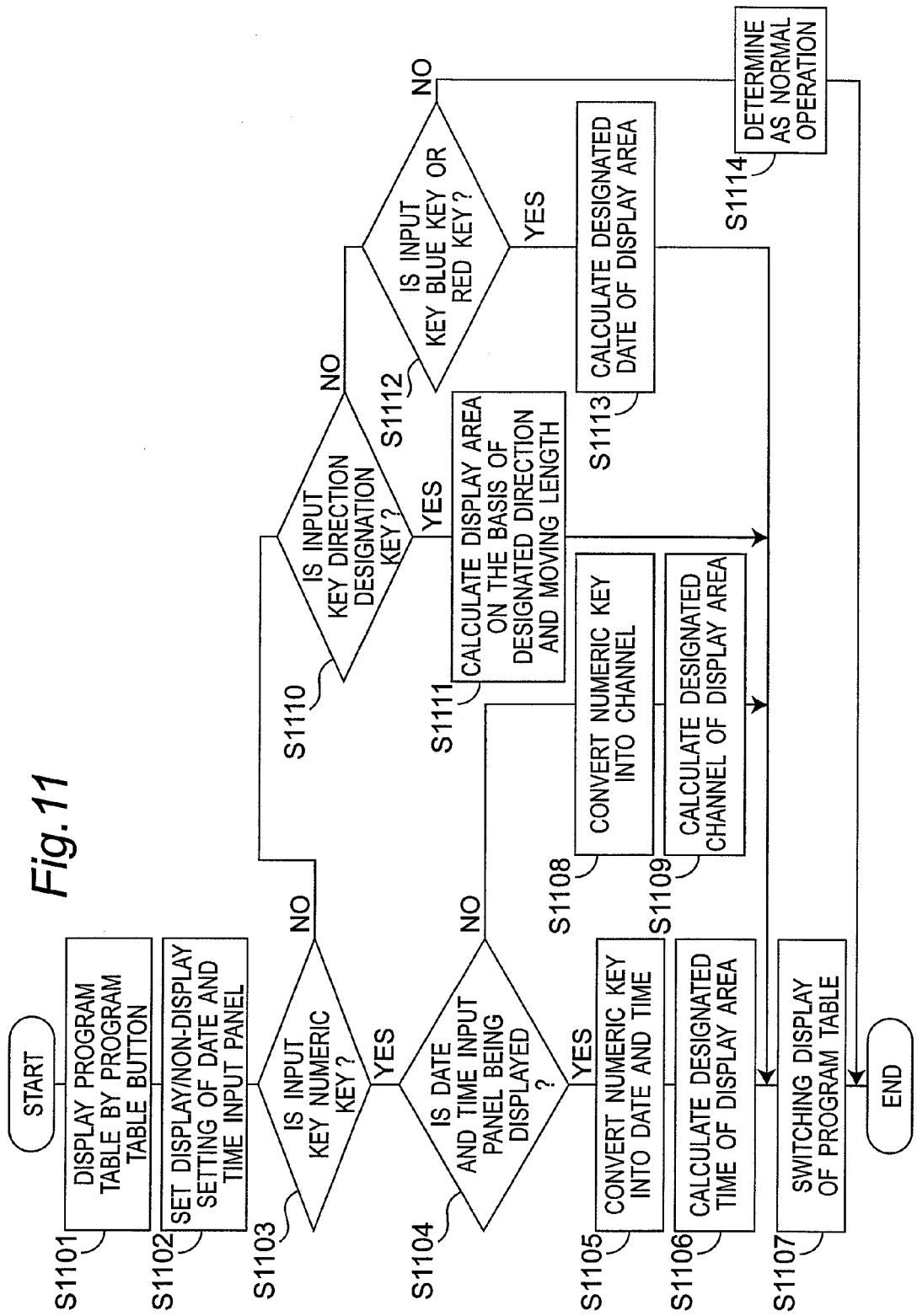
FIG. 11 is a flow chart to perform display switching of display areas of a two-dimensional program table in the electronic program guide display device according to the third embodiment.

FIG. 11 is a flow chart in which a two-dimensional program table is displayed by the EPG display device 900 according to the third embodiment, and a display area is switched to display contents to be calculated by a user.

When the user depresses the program table key 203 (see FIG. 2) of the remote controller 200, a signal of a program table key-input is input to the EPG display device 900. As a result, a two-dimensional program table is displayed on the display part 910 of the EPG display device 900 (S1101).

In the state in which the two-dimensional program table is displayed, the yellow key in the colored key region 202 of the remote controller 200 is operated to set display of the date and time input panel 1001, or non-display of the date and time input panel 1001 is set by operating the return key 205 (S1102).

When a two-dimensional program table is displayed by a program table key-input for the first time, the date and time input panel 1001 is not displayed. When the yellow key is input, as shown in FIG. 10, the date and time input panel 1001 is displayed. While the date and time input panel 1001 is being displayed, the date and time input panel 1001 can be eliminated by an operation of the return key 205 of the remote controller 200.

In a state in which the two-dimensional program table is displayed, the remote control input analyzing part 905 analyzes whether a type of a key-input from the remote controller

200 is the numeric key (S1103). When the input key is the numeric key, it is checked whether the date and time input panel 1001 set in step 1102 is being displayed (S1104). When the date and time input panel 1001 is displayed, the remote control input analyzing part 905 outputs a signal representing a number designated by the numeric key to the date and time converting part 907. The date and time converting part 907 converts the signal represented by the input numeric key into a signal representing a date and time (S1105). The date and time converting part 907 outputs a signal representing the converted time from date and time to the display area calculating part 908. The display area calculating part 908 calculates a display area for the two-dimensional program table on the basis of the input time (S1106). The display area calculating part 908 outputs the calculated display area to the program guide forming part 909. The program guide forming part 909 performs switching display of the two-dimensional program table displayed on the display part 910 (S1107).

For example, as shown in the two-dimensional program table shown in FIG. 10, when the date and time input panel is being displayed, when the numeric keys "0", "1", "2", and "3" of the remote controller 200 are depressed, the EPG display device according to the third embodiment determines "23:00" on the "1st", the date and time are output to the display area calculating part 908, and the display area calculating part 908 calculates a display area for the two-dimensional program table on the basis of the input signal representing the date and time. The display area calculating part 908 outputs the calculated display area to the program guide forming part 909, and the program guide forming part 909 performs switching display of the two-dimensional program table displayed on the display part 910.

When the date and time input panel 1001 is not displayed in step 1104, i.e., in a normal display state of the two-dimensional program table serving as an electronic program guide, the remote control input analyzing part 905 outputs a signal representing a number input by the numeric key to the channel converting part 906. The channel converting part 906 converts the signal representing the number designated by the input numeric key into a signal representing a corresponding channel (S1108). The channel converting part 906 outputs the converted signal representing the channel to the display area calculating part 908. The display area calculating part 908 calculates a display area for the two-dimensional program table on the basis of the input signal representing the channel (S1109). The display area calculating part 908 outputs the calculated display area to the program guide forming part 909. The program guide forming part 909 switches the two-dimensional program table displayed on the display part 910 (S1107).

When the input key is not the numeric key in step 1103, the remote control input analyzing part 905 analyzes whether the input key input from the remote controller 200 is the direction designation key 204 (S1110). When the input key is the direction designation key 204, a signal representing the designated direction and a moving length is output to the display area calculating part 908. The display area calculating part 908 calculates a display area on the two-dimensional program table on the basis of the designated direction and the moving length (S1111). The display area calculating part 908 outputs the calculated display area to the program guide forming part 909. The program guide forming part 909 performs switching display of the two-dimensional program table displayed on the display part 910 (S1107).

In step 1110, when the input key is not the direction designation key 204, the remote control input analyzing part 905 checks whether the input key input from the remote controller 200 is the blue key or the red key in the colored key region 202. When the input key is the blue key, a display area for a designated date is calculated to jump the display screen to a display screen on the previous day. When the input key is the red key, the display area for the designated date is calculated to jump the display screen to a display screen on the next day (S1113).

In step 1112, when the input key is not the blue key or the red key in the colored key region 202, the remote control input analyzing part 905 determines that the input key is a normal operation of the remote controller 200 (S1114).

In the EPG display device according to the third embodiment of the present invention configured as described above, when the numeric key on the remote controller 200 is input, the display area calculating part 908 checks whether the date and time input panel 1001 is being displayed. When the date and time input panel 1001 is being displayed, numbers for designating a date and time are input by the numeric key four times to make it possible to jump the date and time to a target date and time. Therefore, in the EPG display device according to the third embodiment of the present invention, a cumbersome operation of scrolling a display area in a desired direction by continuously depressing a key representing any one of the upward, downward, leftward, and rightward directions in a conventional electronic program guide display device is unnecessary, and the time jump is instantaneously performed by a simple operation to make it possible to display the program on a date and time desired by a user, so that desired screen display can be performed.

Fourth Embodiment

An electronic program guide display device (to be abbreviated as an EPG display device hereinafter) 1200 according to a fourth embodiment of the present invention will be described below with reference to FIGS. 12 to 14.

Figure 12:
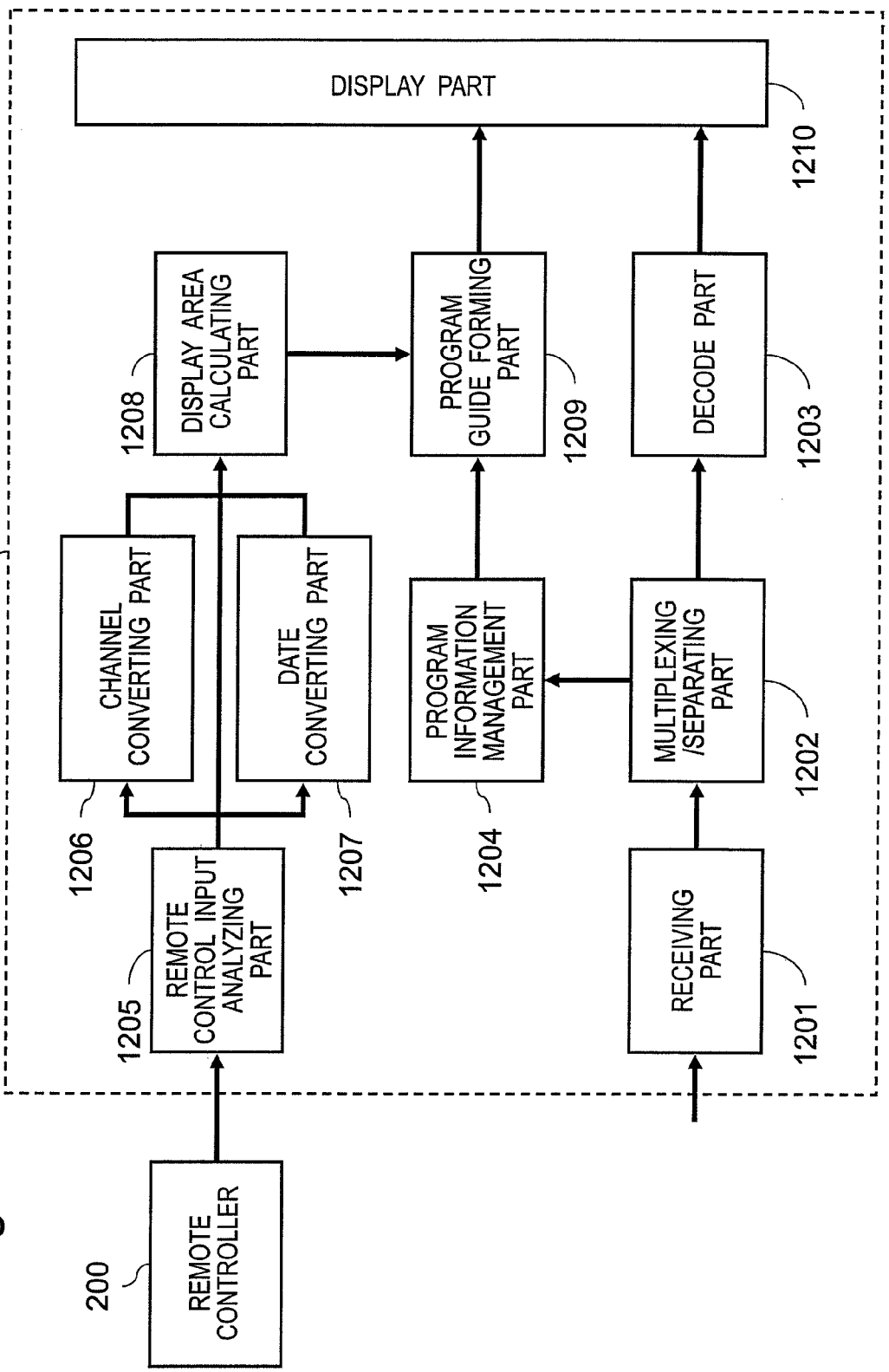
FIG. 12 is a block diagram showing a configuration of an electronic program guide display device in an electronic program guide display device (EPG display device) according to a fourth embodiment.

FIG. 12 is a block diagram showing a configuration of an EPG display device 1200 according to the fourth embodiment of the present invention. The EPG display device 1200 has a configuration in which, on a screen display of a two-dimensional program table, in order to avoid a cumbersome operation of performing scroll along a time axis by an input from the remote controller 200 or a cumbersome operation of performing sequential moving by using a date tub, moving to a program on a desired date can be performed by a small number of key operations on a remote control unit (to be abbreviated as a remote controller hereinafter) 200.

Figure 13:
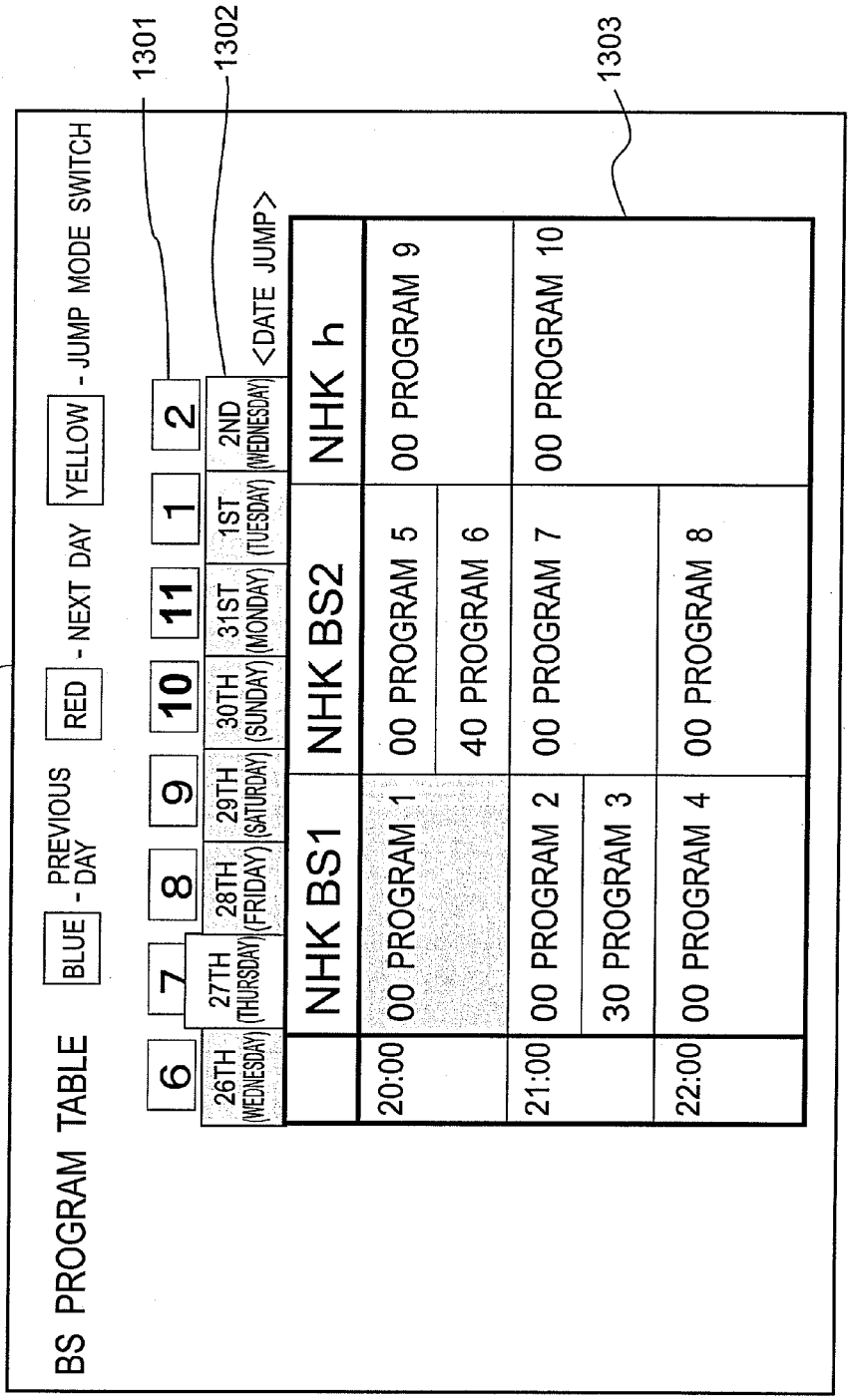
FIG. 13 is a diagram of a display screen of a two-dimensional program table when a date input panel is being displayed in an electronic program guide display device according to the fourth embodiment.

FIG. 13 is a diagram showing a concrete display screen of an electronic program guide (EPG) displayed on a display part 1210 in the EPG display device 1200 according to the fourth embodiment. In the EPG display device 1200 according to the fourth embodiment, the same reference numerals as in the first embodiment described above denote parts having the same functions and configurations in the first embodiment, and a description thereof will be omitted. In the fourth embodiment, a numeric key in a numeric key region 206 on the remote controller 200 is used not only for a channel jump along a channel axis on a two-dimensional program table but also for designating a date of a jump destination when jump is performed by using a date tub.

[Configuration of EPG Display Apparatus 1200]

The EPG display device 1200 has a receiving part 1201, a multiplexing/separating part 1202, a decode part 1203, a program information management part 1204, a remote control input analyzing part 1205, a channel converting part 1206, a date converting part 1207, a display area calculating part 1208, a program guide forming part 1209, and a display part 1210.

In the EPG display device 1200 according to the fourth embodiment, as in the embodiments described above, the receiving part 1201 receives a multiplexed stream of a digital broadcast. The multiplexing/separating part 1202 separates the multiplexed stream input from the receiving part 1201 into arbitrary program information such as digital video information, digital audio information, and service information. The program information includes information representing program information, channel information, time information, and the like. The decode part 1203 decodes the digital video information and the digital audio information input from the multiplexing/separating part 1202. The program information management part 1204 extracts program information from the service information separated by the multiplexing/separating part 1202 and accumulates and manages the program information in all time zones of all the channels.

The remote control input analyzing part 1205 connected to the remote controller 200 such that a signal can be transmitted to the remote controller 200 analyzes a key input signal from the remote controller 200 operated by a user with keys. On the basis of the analysis result, the remote control input analyzing part 1205 selects an output destination of the key input signal. More specifically, the remote control input analyzing part 1205 selects an output destination by a type of an input key and a jump mode of a two-dimensional program table.

When an analysis result of the remote control input analyzing part 1205 is a numeric key, and when a jump mode of the two-dimensional program table is a channel jump mode, the channel converting part 1206 converts a signal represented by a numeric key input from the remote control input analyzing part 1205 into a signal represented by a corresponding channel. When the analysis result of the remote control input analyzing part 1205 is the numeric key, and when the jump mode of the two-dimensional program table is a date jump mode, the date converting part 1207 converts a signal represented by the numeric key input from the remote control input analyzing part 1205 into a signal represented by date information.

The display area calculating part 1208 determines a direction designated by the direction designation key 204 input from remote control input analyzing part 1205 as a scroll direction of a display area of the two-dimensional program table and calculates the position of the display area. Alternatively, the display area calculating part 1208 calculates a date on which the two-dimensional program table is displayed on the basis of a signal representing that the blue key or the red key-input from the remote control input analyzing part 1205 is operated. Furthermore, the display area calculating part 1208 calculates a display area for the two-dimensional program table by the signal representing the corresponding channel input from the channel converting part 1206 or the signal representing the date input from the date converting part 1207.

The program guide forming part 1209 forms a two-dimensional program table on the basis of a calculation result from the display area calculating part 1208 in response to necessary information from the program information management part 1204. The display part 1210 displays a video image by the decoded video information and decoded audio information input from the decode part 1203 or displays a two-dimensional program table input from the program guide forming part 1209.

[Operation of EPG Display Apparatus 1200]

Operations of components in the EPG display device 1200 performed until switching display of a two-dimensional program table is performed on the display part 1210 after the key operation on the remote controller 200 will be described below in detail.

When a user performs a key operation on the remote controller 200, the remote control input analyzing part 1205 analyzes whether any one of the keys is operated on the basis of the signal representing the key-input from the remote controller 200. More specifically, the remote control input analyzing part 1205 analyzes whether, as a type of a key-input, any one of key signals of the yellow key to change a jump mode, the direction designation key to move a cursor position on the two-dimensional program table one by one (by the hour or in units of channels), the blue key or the red key to change a date of the two-dimensional program table, the numeric key to jump a channel or a date on the two-dimensional program table, and other keys is input.

When an analysis result of the input key from the remote controller 200 is the direction designation key 204, the remote control input analyzing part 1205 outputs a signal representing a direction designated by the direction designation key 204 to the display area calculating part 1208. When the analysis result of the input key from the remote controller 200 is the blue key, the remote control input analyzing part 1205 outputs a signal representing a date one day before the present date to the display area calculating part 1208. When the analysis result is the red key, the remote control input analyzing part 1205 outputs a date one day after the present date to the display area calculating part 1208. When the analysis result of the input key from the remote controller 200 is the yellow key, the remote control input analyzing part 1205 confirms that the jump mode on the two-dimensional program table is any one of a channel jump mode and the date jump mode. Each time the yellow key is input once, the jump mode is switched between the channel jump mode and the date jump mode. When the analysis result of the input key from the remote controller 200 is the numeric key, and when the channel jump mode is set as the jump mode, the remote control input analyzing part 1205 outputs a number designated by the numeric key to the channel converting part 1206. On the other hand, when the analysis result of the input key from the remote controller 200 is the numeric key, and when the date jump mode is set as the jump mode, the remote control input analyzing part 1205 outputs the number designated by the numeric key to the date converting part 1207.

The channel converting part 1206 converts a signal representing the number designated by the numeric number input from the remote control input analyzing part 1205 into a signal representing a corresponding channel. The converted channel is output to the display area calculating part 1208 as a channel serving as a reference position on the two-dimensional program table. For example, when the numeric key "2" is input by the remote controller 200, channel 2 is a channel at the reference position on the two-dimensional program table.

The date converting part 1207 converts the signal representing the number of the numeric key input from the remote control input analyzing part 1205 into a signal representing a corresponding date, and outputs the signal to the display area calculating part 1208 as a date displayed by the two-dimensional program table.

When the direction designation key 204 is input from the remote control input analyzing part 1205, the display area calculating part 1208 calculates a cursor position of a program field displayed on a present two-dimensional program table such that the cursor position is moved by only one (moved by the hour or in units of channels) in a direction designated by the direction designation key 204. When a signal representing the blue key is input from the remote control input analyzing part 1205, the display area calculating part 1208 calculates a position of a program field displayed on the present two-dimensional program table such that a date of the program field is moved to a previous day. Alternatively, when a signal representing the red key is input, the display area calculating part 1208 calculates a position of the program field such that a date of the program field displayed on the present two-dimensional program table is moved to the next day.

When a signal representing a channel serving as a reference position on a display of the two-dimensional program table is input from the channel converting part 1206, the display area calculating part 1208 calculates a display style of the two-dimensional program table such that the designated channel is the reference position of the display of the two-dimensional program table. For example, the display style of the two-dimensional program table is calculated such that the designated channel is a channel at the center of a channel axis on the two-dimensional program table.

When a signal representing a date on which the two-dimensional program table is displayed is input from the date converting part 1207, the display area calculating part 1208 does not change the time and the channel displayed at the present. The display area calculating, part 1208 considers that a date tab of the designated date is selected, and calculates a display style of the two-dimensional program table. The display area calculating part 1208 outputs the calculated display area of the two-dimensional program table to the program guide forming part 1209.

The program guide forming part 1209 receives the program information accumulated and managed by the program information management part 1204 to form a two-dimensional program table in response to the display area calculated by the display area calculating part 1208. The program guide forming part 1209 designates the display part 1210 such that the two-dimensional program table displayed at the present on the display part 1210 is switched to the newly formed two-dimensional program table to display the new two-dimensional program table.

The display part 1210 switches the two-dimensional program table displayed at the present to the new two-dimensional program table input from the program guide forming part 1209 to display the new two-dimensional program table.

[Two-Dimensional Program Table by EPG Display Apparatus 1200]

A two-dimensional program table serving as an electronic program guide (EPG) and formed and displayed by the EPG display device 1200 according to the fourth embodiment of the present invention will be described below with reference to FIG. 13.

FIG. 13 is a diagram showing a concrete display screen of the two-dimensional program table displayed on the display part 1210. FIG. 13 is a diagram obtained when a date jump mode is set in a display of the two-dimensional program table. In FIG. 13, channels are horizontally arranged, times are vertically arranged, and a date tab 1302 representing a date is arranged in an upper portion of a program field 1303.

In general, information of the electronic program guide (EPG) has information for 8 days including the information on the present date, and does not have information subsequent to the information for the 8 days. Further, The information of the electronic program guide does not include information subsequent to the present time. For this reason, the EPG display device according to the fourth embodiment can display only the information for the 8 days from the present date.

In the EPG display device according to the fourth embodiment, as shown in FIG. 13, on the display screen obtained when the date jump mode is set, the date tabs 1302 for 8 days are displayed on an upper portion of the program field 1303. A number of a numeric key serving as a remote control guide 1301 is displayed on each of the upper portions of the date tabs 1302 for the 8 days, respectively. On the concrete display screen shown in FIG. 13, the date tabs 1302 "Wednesday the 26th" to "Monday the 31st", "Tuesday the 1st", and "Wednesday the 2nd" and the remote control guide 1301 represented by numbers "6" to "11", "1", and "2" as numeric keys corresponding to the date tabs 1302 are displayed. In the remote control guide 1301 and the date tabs 1302, numbers of the last one figure(s) of the date numbers represented by the date tabs 1302 are allocated to the numbers of the remote control guide 1301, respectively. A numeric key "10" is associated with the date "30th", and the "31st" may be subsequent to the "1st", the date "31st" uses the numeric key "1" as a number of the remote control guide 1301, and the date "1st" uses the numeric key "1" as a number of the remote control guide 1301.

The EPG display device according to the fourth embodiment of the present invention has not only a configuration which can move a cursor of the two-dimensional program table one by one (by the hour or in units of channels) by the direction designation key 204, but also a configuration, as shown in FIG. 13, the date jump mode is set as the jump mode by the yellow key in the colored key region 202 on the remote controller 200 to make it possible to jump the date to a desired date by inputting the numeric key.

[Formation and Display of Two-Dimensional Program Table]

A flow of formation and display of a two-dimensional program table serving as an electronic program guide (EPG) by the EPG display device 1200 according to the fourth embodiment of the present invention will be described below with reference to FIG. 14.

Figure 14:
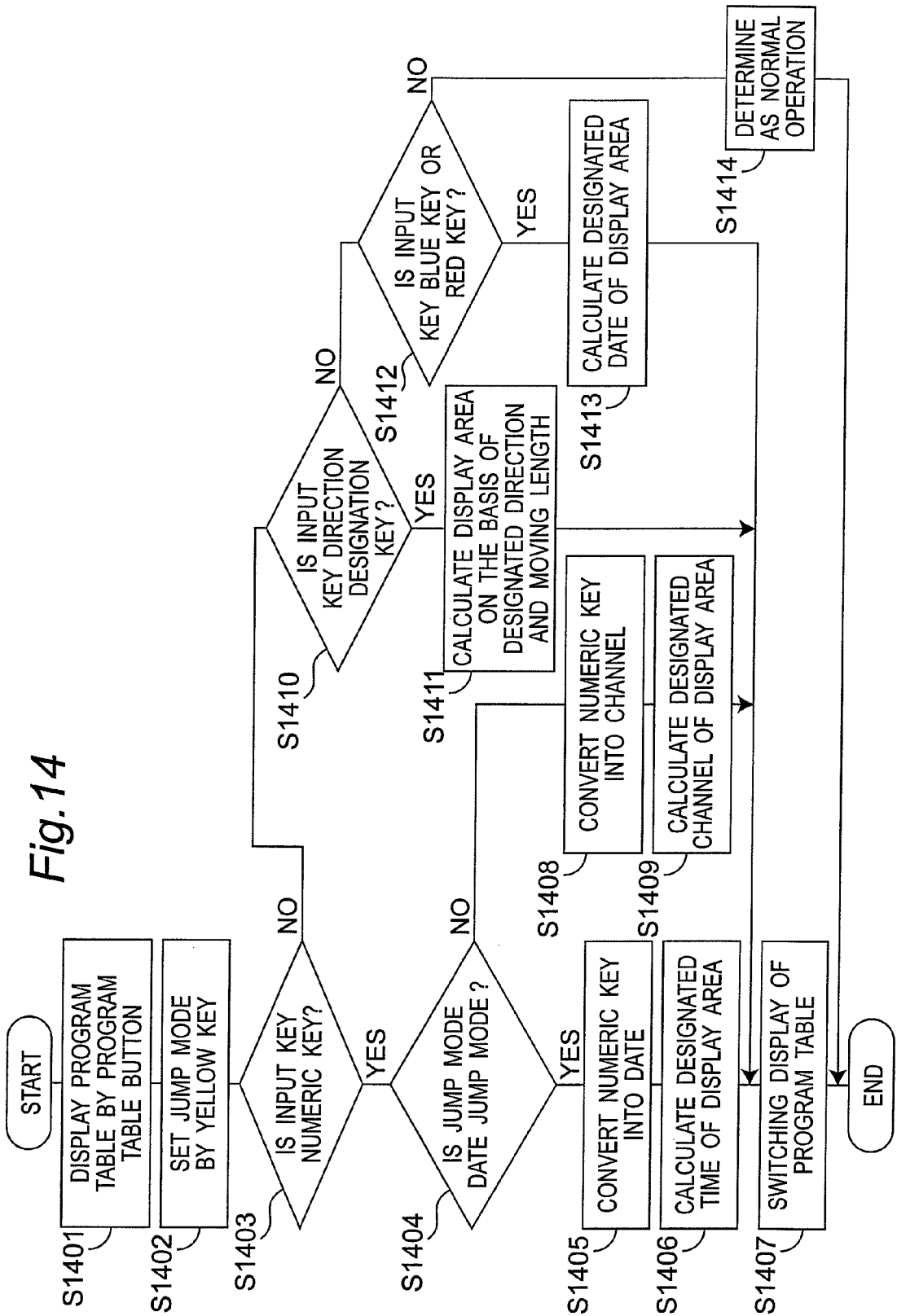
FIG. 14 is a flow chart to perform display switching of display areas of a two-dimensional program table in the electronic program guide display device according to the fourth embodiment.
Figure 15:
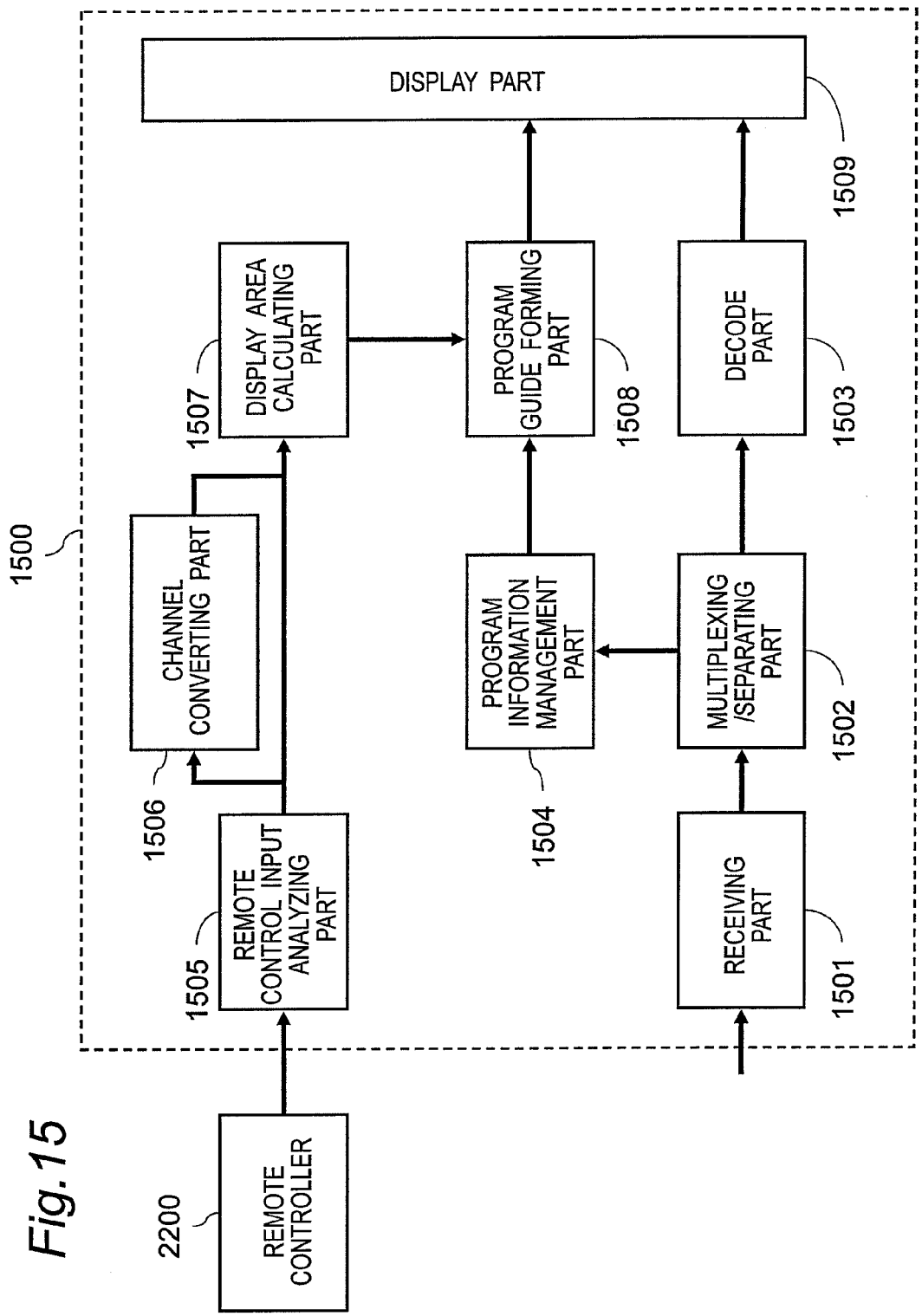
FIG. 15 is a block diagram showing a configuration of a conventional electronic program guide display device.

FIG. 14 is a flow chart in which a two-dimensional program table is displayed by the EPG display device 1200 according to the fourth embodiment, and a display area is switched to display contents to be calculated by a user.

When the user depresses the program table key 203 (see FIG. 2) of the remote controller 200, a signal of a program table key-input is input to the display part 1210 of the EPG display device 1200. As a result, a two-dimensional program table is displayed on the display part of the EPG display device 1200 (S1401).

In the state in which the two-dimensional program table is displayed, the yellow key in the colored key region 202 of the remote controller 200 is operated to set a jump mode on the two-dimensional program table. The remote control input analyzing part 1205 analyzes a signal of a yellow key-input transmitted from the remote controller 200 to check whether the jump mode is any one of the channel jump mode and the date jump mode (S1402). As an initial setting of the jump mode, the channel jump mode is set. Therefore, the channel jump mode of the two-dimensional program table is displayed by the first operation of the yellow key. Thereafter, each time the yellow key is operated once, the date jump mode and the channel jump mode are sequentially switched.

In the state in which the two-dimensional program table is displayed, the remote control input analyzing part 1205 analyzes whether a type of a key-input from the remote controller 200 is a numeric key (S1403). When the input key is the numeric key, it is checked whether the jump mode set in step 1402 is the date jump mode (S1404). When the jump mode is the date jump mode, the remote control input analyzing part 1205 outputs a signal representing a number designated by the numeric key to the date converting part 1207. The date converting part 1207 converts the signal represented by the input numeric key into a signal representing a date (S1405). The signal representing the date converted by the date converting part 1207 is output to the display area calculating part 1208. The display area calculating part 1208 calculates a display area for the two-dimensional program table on the basis of the signal representing the input date (S1406). The display area calculating part 1208 outputs the calculated display area to the program guide forming part 1209. The program guide forming part 1209 performs switching display of the two-dimensional program table displayed on the display part 1210 (S1407).

For example, as shown in the two-dimensional program table shown in FIG. 13, in the state of the date jump mode, i.e., in a stat in which a two-dimensional program table on a currently displayed date "27th (Thursday)" and a time "20:00 (8:00 p.m.)" is displayed, when a numeric key "11" in the numeric key region 206 of the remote controller 200 is depressed, the following operation is performed.

The remote control input analyzing part 1205 which recognizes that the numeric key input from the remote controller 200 is "11" confirms that the jump mode is the date jump mode. The remote control input analyzing part 1205 outputs a signal represented by the input numeric key "11" to the date converting part 1207, and converts the signal represented by the numeric key "11" into a signal represented by the "31st (Monday)". The date converting part 1207 outputs the converted signal representing the "31st (Monday)" to the display area calculating part 1208. The display area calculating part 1208 calculates a display area of the two-dimensional program table on the basis of the input signal representing the "31st (Monday)". The display area calculating part 1208 outputs the calculated display area to the program guide forming part 1209. The program guide forming part 1209 performs switching display of the two-dimensional program table displayed on the display part 1210 (S1407).

On the other hand, in step 1404, when the jump mode is not the date jump mode, i.e., when the jump mode is the channel jump mode, the remote control input analyzing part 1205 outputs the signal representing the number input by the numeric key to the channel converting part 1206. The channel converting part 1206 converts the signal representing the input number into a signal representing a corresponding channel (S1408). The channel converting part 1206 outputs the signal representing the converted channel to the display area calculating part 1208. The display area calculating part 1208 calculates a display area for the two-dimensional program table on the basis of the input signal representing the channel (S1409). The display area calculating part 1208 outputs the calculated display area to the program guide forming part 1209. the program guide forming part 1209 performs switching display of the two-dimensional program table displayed on the display part 1210 (S1407).

In step 1403, when the input key is not the numeric key, the remote control input analyzing part 1205 analyzes whether the input key input from the remote controller 200 is the direction designation key 204 (S1410). When the input key is the direction designation key 204, the remote control input analyzing part 1205 outputs a signal representing a direction designated by the direction designation key 204 and a moving length to the display area calculating part 1208. The display area calculating part 1208 calculates the display area of the two-dimensional program table on the basis of the designated direction and the moving length (S1411). The display area calculating part 1208 outputs the calculated display area to the program guide forming part 1209. The program guide forming part 1209 performs switching display of the two-dimensional program table displayed on the display part 1210 (S1407).

In step 1410, when the input key is not the direction designation key 204, the remote control input analyzing part 1205 checks whether the input key input from the remote controller 200 is the blue key or the red key-input from the remote controller 200 (S1412). When the input key is the blue key, a display area for a designated date is calculated to jump the display screen to a display screen on the previous day. When the input key is the red key, the display area is calculated to jump the display screen to a display screen on the next day (S1413). The display area calculating part 1208 outputs the date of the calculated display area to the program guide forming part 1209. The program guide forming part 1209 performs switching display of the two-dimensional program table displayed on the display part 1210 (S1407).

In step 1412, when the input key is not the blue key or the red key in the colored key region 202, the remote control input analyzing part 1205 determines that the input key is a normal operation of the remote controller 200 (S1414).

In the EPG display device according to the fourth embodiment of the present invention configured as described above, when the jump mode is the date jump mode, the date can be moved to a desired date by inputting the numeric key on the remote controller 200 only once. Therefore, in the EPG display device according to the fourth embodiment of the present invention, a cumbersome operation of scrolling a display area in a desired direction by continuously depressing a key representing any one of the upward, downward, leftward, and rightward directions in a conventional electronic program guide display device is unnecessary, and date jump is instantaneously performed by a simple operation to make it possible to display the program desired by a user, so that desired screen display can be performed.

In the EPG display device according to the fourth embodiment of the present invention, the yellow key is used to shift the jump mode to the date jump mode. However, the jump mode may be automatically changed into the date jump mode when a date moving operation is performed by the blue key or the red key. In this case, the remote control guide 1301 of the date jump is displayed for about 3 seconds. In the meantime, when the numeric key is not input, the jump mode may be automatically returned to the channel jump mode.

As described above, in the electronic program guide display device (EPG display device) and the electronic program guide display method (EPG display method) according to the present invention, in order to display a program desired to be browsed by a user on a two-dimensional program table, without sequentially scrolling the two-dimensional program table to display a desired program by operating a key for designating any one of the upward, downward, leftward, and rightward directions on the remote controller for a long period of time, a program desired to be browsed by the user can be instantaneously displayed on a screen by a simple operation. In the present invention, the electronic program guide display device is configured such that a user can perform an intuitive key operation. A desired date or a desired time are designated by using numeric keys added with numbers on the remote controller and the direction designation key representing the leftward and rightward directions, and a desired program on the two-dimensional program table can be instantaneously displayed to achieve good operability.

The electronic program guide display device (EPG display device) and the electronic program guide display method (EPG display method) according to the present invention are not limited to the configurations of the embodiments described above, and include all the configurations structured by the same technical idea as that of the invention. For example, the invention is described by an example in which the numeric keys representing numbers "1" to "12" are arranged in the numeric key region of the remote controller according to the embodiments. However, the case in which numeric keys added with the numbers "0" to "9", characters or signs, and the like are arranged can cope with the invention. In this case, the numeric key "10" on the remote controller 200 according to the embodiments is associated with a numeric key "0", and the numeric keys "11" and "12" on the remote controller 200 are associated with keys using the characters, the signs, and the like.

In the electronic program guide display device (EPG display device) and the electronic program guide display method (EPG display method) according to the present invention, a day of the week may be jumped to a designated day of the week. In this case, the numeric keys of the remote controller are associated with days of the week, respectively. For example, the numeric keys "1", "2", "3", "4", "5", "6", and "7" are used to be associated with "Sunday", "Monday", "Tuesday", "Wednesday", "Thursday", "Friday", "Saturday", and "Sunday", respectively, and these relationships are displayed on the display area. With the above configuration, day-of-week jump can be performed by using the numeric keys of the remote controller.

The electronic program guide display device (EPG display device) and the electronic program guide display method (EPG display method) according to the present invention can be configured such that a program field on a date before or after the date of a display screen is instantaneously displayed by using the numeric keys of the remote controller. In this case, for example, the numeric keys may be operated after the operation of the blue key in the colored key region to display a program days the number of which is represented by the numeric key before, and the numeric keys may be operated after the operation of the red key to display a program days the number of which is represented by the numeric key after.

INDUSTRIAL APPLICABILITY

The present invention is used in a broadcast receiver which receives additional information related to channels, program, and the like which are being broadcasted or expected to be broadcasted and has good operability in searching for a desired program or in acquisition of program information. For this reason, the present invention is useful in an electronic program guide display device and an electronic program guide display method.

The invention claimed is:

1. An electronic program guide display device comprising:
    a remote control input analyzing part which analyzes a key-input signal received from a remote control unit;
    a date converting part which converts the analyzed key-input signal into a date signal indicating a date;
    a display area calculating part which calculates a display area for a two-dimensional program table required when a date tab of the two-dimensional program table is changed based on the date signal; and
    a program guide forming part which forms the two-dimensional program table in the calculated display area,
    wherein, when the remote control input analyzing part analyzes (i) that the received key-input signal is an instruction to shift to a date jump mode, and (ii) that another key-input signal subsequently received from the remote control unit represents a numeric key of the remote control unit, the another key-input signal representing the numeric key of the remote control unit is output to the date converting part as the analyzed key-input signal, and
    wherein the date converting part is configured to convert the analyzed key-input signal representing the numeric key of the remote control unit into the date signal indicating a nearest future date having a last-one-digit number corresponding to the numeric key represented by the analyzed key-input signal, and to output the date signal indicating the nearest future date to the display area calculating part.

2. The electronic program guide display device according to claim 1, wherein the remote control unit is configured to have at least numeric keys "1" to "11" and the date converting part is configured to convert the analyzed key-input signal representing the numeric key into the date signal indicating a date of the "31st," when the numeric key represented by the analyzed key-input signal is "11".

3. An electronic program guide display method comprising the steps of:
    analyzing a key-input signal received from a remote control unit;
    converting the analyzed key-input signal into a date signal indicating a date;
    calculating a display area for a two-dimensional program table required when a date tab of the two-dimensional program table is changed based on the date signal; and
    forming the two-dimensional program table in the calculated display area,
    wherein, when the step of analyzing analyzes (i) that the received key-input signal is an instruction to shift to a date jump mode, and (ii) that another key-input signal subsequently received from the remote control unit represents a numeric key of the remote control unit, the another key-input signal representing the numeric key of the remote control unit is output to the step of converting the analyzed key-input signal as the analyzed key-input signal, and
    wherein, in the step of converting the analyzed key-input signal into the data signal indicating the date, the analyzed key-input signal representing the numeric key of the remote control unit is converted into the date signal indicating a nearest future date having a last-one-digit number corresponding to the numeric key represented by the analyzed key-input signal.

* * * * *